United States Patent
Yamaguchi et al.

(10) Patent No.: US 11,341,592 B2
(45) Date of Patent: May 24, 2022

(54) VEHICLE AUTHENTICATION METHOD, RECORDING MEDIUM STORING PROGRAM, TERMINAL DEVICE, AND VEHICLE AUTHENTICATION SYSTEM

(71) Applicant: Panasonic Intellectual Property Corporation of America, Torrance, CA (US)

(72) Inventors: Takuya Yamaguchi, Osaka (JP); Naoyuki Harada, Osaka (JP); Hideo Umetani, Osaka (JP); Shuhei Matsui, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 325 days.

(21) Appl. No.: 16/037,019

(22) Filed: Jul. 17, 2018

(65) Prior Publication Data
US 2019/0035041 A1    Jan. 31, 2019

(30) Foreign Application Priority Data
Jul. 28, 2017    (JP) .............................. JP2017-145993

(51) Int. Cl.
G06Q 50/26    (2012.01)
G06Q 10/02    (2012.01)

(52) U.S. Cl.
CPC ........... *G06Q 50/265* (2013.01); *G06Q 10/02* (2013.01)

(58) Field of Classification Search
CPC ...... G06Q 50/265; G06Q 10/02; G06Q 50/30; H04L 63/0876; H04L 67/12
See application file for complete search history.

(56) References Cited

U.S. PATENT DOCUMENTS 6,154,658 A     11/2000  Caci
7,181,409 B1 *  2/2007   Murakami ............. G06Q 10/02
                                                  705/5
(Continued)

FOREIGN PATENT DOCUMENTS

JP    2002-312893 A    10/2002
JP    2009-282596 A    12/2009
(Continued)

OTHER PUBLICATIONS

Glaschenko. "Multiagent real time scheduling system for taxi" (Year: 2009).*

(Continued)

*Primary Examiner* — Sangeeta Bahl
(74) *Attorney, Agent, or Firm* — Greenblum & Bernstein, P.L.C.

(57) ABSTRACT

A vehicle authentication method, a recording medium storing a program, a terminal device, and a vehicle authentication system which may raise security level on vehicle authentication by a user are provided. In the vehicle authentication method, the terminal device acquires a vehicle authenticator for authentication of a reserved vehicle, sends a reference vehicle a request for a vehicle authenticator for authentication of the reference vehicle, and determines whether the vehicle authenticators of the reference vehicle and the reserved vehicle coincide. Then a message that the reference vehicle is the reserved vehicle is displayed on the display unit upon determination that the vehicle authenticators of the reference vehicle and the reserved vehicle coincide. And a message that the reference vehicle is not the reserved vehicle is displayed on the display unit upon determination that the vehicle authenticators of the reference vehicle and the reserved vehicle do not coincide.

10 Claims, 12 Drawing Sheets

(56) References Cited

U.S. PATENT DOCUMENTS

| | | | |
|---|---|---|---|
| 9,442,888 B2* | 9/2016 | Stanfield | F02N 11/0807 |
| 9,771,018 B2* | 9/2017 | Fournier | B60R 25/25 |
| 9,805,605 B2* | 10/2017 | Ramanujam | G06Q 10/00 |
| 2011/0112969 A1* | 5/2011 | Zaid | G06Q 10/02 |
| | | | 705/50 |
| 2012/0150427 A1* | 6/2012 | Jeong | G01C 21/3407 |
| | | | 701/465 |
| 2012/0203599 A1* | 8/2012 | Choi | G06Q 30/02 |
| | | | 705/13 |
| 2013/0317693 A1* | 11/2013 | Jefferies | G07B 15/00 |
| | | | 701/31.5 |
| 2015/0081362 A1* | 3/2015 | Chadwick | G06Q 10/06311 |
| | | | 705/7.14 |
| 2016/0027079 A1* | 1/2016 | Schoeffler | G06Q 30/0609 |
| | | | 705/325 |
| 2016/0082926 A1 | 3/2016 | Mouser et al. | |
| 2017/0043783 A1* | 2/2017 | Shaw | B60N 2/002 |
| 2017/0127215 A1* | 5/2017 | Khan | G08G 1/202 |
| 2017/0268278 A1* | 9/2017 | Ichinose | E05F 15/74 |
| 2017/0294130 A1* | 10/2017 | Donnelly | H04W 12/50 |
| 2017/0349145 A1* | 12/2017 | Tanabe | E05F 15/73 |
| 2018/0093619 A1* | 4/2018 | Han | B60R 1/00 |
| 2019/0139344 A1* | 5/2019 | Harada | G06Q 30/0645 |

FOREIGN PATENT DOCUMENTS

| | | | | |
|---|---|---|---|---|
| JP | 2015-230690 | | 12/2015 | |
| WO | WO-2018230679 A1 | * | 12/2018 | G01C 21/34 |

OTHER PUBLICATIONS

Extended European Search Report, dated Sep. 24, 2018, by the European Patent Office (EPO) for the related European Patent Application No. 18183378.1.

Summons to Attend Oral Proceedings, dated Jan. 28, 2021 by the European Patent Office, for the related European Patent Application No. 18 183 378.1.

* cited by examiner

VEHICLE AUTHENTICATION METHOD, RECORDING MEDIUM STORING PROGRAM, TERMINAL DEVICE, AND VEHICLE AUTHENTICATION SYSTEM

BACKGROUND

1. Technical Field

The present disclosure relates to a vehicle authentication method, a recording medium storing a program, a terminal device, and a vehicle authentication system.

2. Description of the Related Art

In recent years, taxi reservation systems in which users reserve vehicles such as taxis have been developed. Focusing attention on such taxi reservation systems, it is conceived that a user may encounter danger such as being taken away by a vehicle disguised as a vehicle reserved by the user. As a taxi reservation system, therefore, a system is demanded which may be safely used by everyone such as children, the elderly, and persons being drunk.

In a vehicle confirmation system disclosed in Japanese Unexamined Patent Application Publication No. 2015-230690, a message is displayed on display units installed on a taxi. In the vehicle confirmation system, the message is transmitted via a server to a terminal device and the terminal device which receives the message displays the message. Thus communication to a user of features by which a reserved taxi may be identified makes it possible for the user to get in the taxi after confirming that the taxi is safe.

SUMMARY

In the vehicle confirmation system, however, attentiveness and judgment are demanded because safety is confirmed by visual check as to whether the features of vehicles coincide or not. It is difficult to say that safety for users such as children, the elderly, and persons being drunk is secured in this method.

One non-limiting and exemplary embodiment provides a vehicle authentication method, a recording medium storing a program, a terminal device, and a vehicle authentication system by which security level on authentication of a vehicle by a user may be raised.

In one general aspect, the techniques disclosed here feature a vehicle authentication method in which a terminal device authenticates whether a reference vehicle having arrived at a vicinity of a user is a reserved vehicle in which the user is to get in accordance with a reservation or not. The terminal device acquires a vehicle authenticator for authentication of the reserved vehicle, sends the reference vehicle a request for a vehicle authenticator for authentication of the reference vehicle, determines whether the vehicle authenticator of the reference vehicle coincides with the vehicle authenticator of the reserved vehicle or not, and displays a message, indicating that the reference vehicle is the reserved vehicle, on a display unit upon determination that the vehicle authenticator of the reference vehicle coincides with the vehicle authenticator of the reserved vehicle, or displays a message, indicating that the reference vehicle is not the reserved vehicle, on the display unit upon determination that the vehicle authenticator of the reference vehicle does not coincide with the vehicle authenticator of the reserved vehicle.

It should be noted that general or specific embodiments may be implemented as a system, an apparatus, an integrated circuit, a computer program, a computer readable recording medium such as a CD-ROM, or any selective combination thereof.

According to the disclosure, security level on the authentication of a vehicle by the user may be raised.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Figure 1:
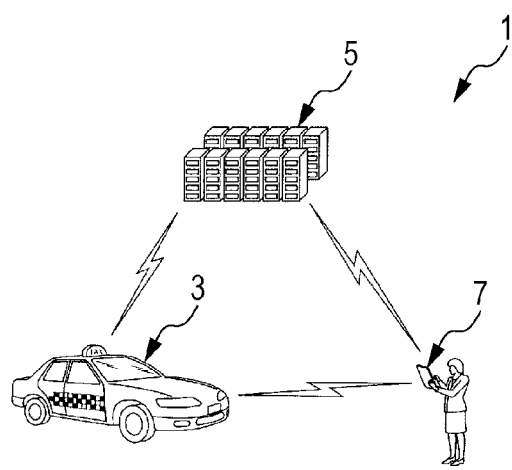
FIG. 1 is a schematic diagram illustrating a vehicle authentication system according to a first embodiment.

A vehicle authentication method according to an embodiment of the disclosure is a vehicle authentication method in which a terminal device authenticates whether a reference vehicle having arrived at a vicinity of a user is a reserved vehicle in which the user is to get in accordance with a reservation or not. The terminal device acquires a vehicle authenticator for authentication of the reserved vehicle, sends the reference vehicle a request for a vehicle authenticator for authentication of the reference vehicle, determines whether the vehicle authenticator of the reference vehicle coincides with the vehicle authenticator of the reserved vehicle or not, and displays a message, indicating that the reference vehicle is the reserved vehicle, on a display unit upon determination that the vehicle authenticator of the reference vehicle coincides with the vehicle authenticator of the reserved vehicle, or displays a message, indicating that the reference vehicle is not the reserved vehicle, on the display unit upon determination that the vehicle authenticator of the reference vehicle does not coincide with the vehicle authenticator of the reserved vehicle.

Accordingly, the terminal device acquires the vehicle authenticator for the authentication of the reserved vehicle and, when the reference vehicle meets the request from the terminal device, acquires the vehicle authenticator of the reference vehicle from the reference vehicle. A determination unit of the terminal device determines whether the vehicle authenticator of the reference vehicle coincides with the vehicle authenticator of the reserved vehicle or not. Upon the determination that the vehicle authenticator of the reference vehicle coincides with the vehicle authenticator of the reserved vehicle, the determination unit displays the message, indicating that the reference vehicle is the reserved vehicle, on the display unit. Upon the determination that the vehicle authenticator of the reference vehicle does not coincide with the vehicle authenticator of the reserved vehicle, the determination unit displays the message, indicating that the reference vehicle is not the reserved vehicle, on the display unit.

Thus security level on the authentication of the reference vehicle by the user may be raised.

Particularly, the vehicle authentication method may promote safety in use of vehicles because the user may recognize the message indicating that the reference vehicle is the reserved vehicle and the message indicating that the reference vehicle is not the reserved vehicle.

A program according to an embodiment of the disclosure makes a computer execute the vehicle authentication method.

A terminal device according to an embodiment of the disclosure is a terminal device that authenticates whether a reference vehicle having arrived at a vicinity of a user is a reserved vehicle in which the user is to get in accordance with a reservation or not. The terminal device includes: a storage unit that acquires and stores a vehicle authenticator for authentication of the reserved vehicle; a request unit that sends the reference vehicle a request for a vehicle authenticator for authentication of the reference vehicle; a determination unit that determines whether the vehicle authenticator of the reference vehicle coincides with the vehicle authenticator of the reserved vehicle or not; and a display unit that displays a message, indicating that the reference vehicle is the reserved vehicle, when the determination unit determines that the vehicle authenticator of the reference vehicle coincides with the vehicle authenticator of the reserved vehicle, or displays a message, indicating that the reference vehicle is not the reserved vehicle, when the determination unit determines that the vehicle authenticator of the reference vehicle does not coincide with the vehicle authenticator of the reserved vehicle.

A vehicle authentication system according to an embodiment of the disclosure includes a terminal device, a reserved vehicle in which a user is to get in accordance with a reservation, and a vehicle dispatch server that determines the reserved vehicle. The terminal device includes: a storage unit that receives and stores a vehicle authenticator for authentication of the reserved vehicle from the vehicle dispatch server; a request unit that sends a reference vehicle, having arrived at a vicinity of the user, a request for a vehicle authenticator for authentication of the reference vehicle; a determination unit that determines whether the vehicle authenticator of the reference vehicle coincides with the vehicle authenticator of the reserved vehicle or not; and a display unit that displays a message indicating that the reference vehicle is the reserved vehicle, upon determination that the vehicle authenticator of the reference vehicle coincides with the vehicle authenticator of the reserved vehicle, or displays a message indicating that the reference vehicle is not the reserved vehicle, upon determination that the vehicle authenticator of the reference vehicle does not coincide with the vehicle authenticator of the reserved vehicle.

Function effects similar to those described above may be achieved thereby.

In a vehicle authentication method according to an embodiment of the disclosure, the vehicle dispatch server generates the vehicle authenticator for the authentication of the reserved vehicle and the terminal device and the reserved vehicle each receive and retain the vehicle authenticator for the authentication of the reserved vehicle from the vehicle dispatch server before the terminal device makes the determination.

Accordingly, the vehicle dispatch server generates the vehicle authenticator for the authentication of the reserved vehicle. The terminal device and the reserved vehicle each receive and retain the vehicle authenticator, generated by the vehicle dispatch server for the authentication of the reserved vehicle, from the vehicle dispatch server before the terminal device determines whether the vehicle authenticator of the reference vehicle coincides with the vehicle authenticator of the reserved vehicle or not. Thus the terminal device is capable of receiving the vehicle authenticator of the reserved vehicle from the vehicle dispatch server each time the vehicle dispatch server generates the vehicle authenticator of the reserved vehicle. Therefore, the security level on the authentication of the reference vehicle by the user may be raised by generation of the vehicle authenticator of the reserved vehicle by the vehicle dispatch server with use of random numbers, for instance.

In a vehicle authentication method according to an embodiment of the disclosure, the terminal device determines whether there has been any response to the request to the reference vehicle or not within a first specified period after the request for the vehicle authenticator to the reference vehicle and, upon determination that the first specified period had elapsed before reception of the response, displays a message, indicating that the reference vehicle is not the reserved vehicle but may be a malicious vehicle, on the display unit.

Accordingly, the terminal device determines whether there has been any response to the request to the reference vehicle or not within the first specified period after the request for the vehicle authenticator to the reference vehicle. Upon the determination that the first specified period had elapsed before the reception of the response, the terminal device displays the message, indicating that the reference vehicle may not be the reserved vehicle but may be a malicious vehicle, on the display unit. In case where the first specified period had elapsed, it is conceivable that the reference vehicle may not be the reserved vehicle, that is, that the reference vehicle may be a malicious vehicle. Thus the user may acknowledge that the reference vehicle may be a malicious vehicle, based on the message displayed on the display unit, so that the safety in the use of vehicles by the user may be promoted.

By such suppression of erroneous boarding of the user into a vehicle other than the reserved vehicle, wasteful dispatch of the reserved vehicle by the vehicle dispatch server may be reduced and thus decrease in usage efficiency for the reserved vehicle may be suppressed.

In a vehicle authentication method according to an embodiment of the disclosure, a detection unit of the terminal device detects opening of a door of the reference vehicle and the terminal device determines whether time of the detection of the opening of the door of the reference vehicle by the detection unit is within a prescribed period preceding the reception of the response or not and, upon determination that the time of the detection by the detection unit is not within the prescribed period, displays the message, indicating that the reference vehicle is not the reserved vehicle but may be a malicious vehicle, on the display unit.

Accordingly, the terminal device determines whether the time of the detection of the opening of the door of the reference vehicle by the detection unit is within the prescribed period preceding the reception of the response or not. In case where the door of the reference vehicle is opened before the reception of the response from the reference vehicle, for instance, it is conceivable that the reference vehicle may not be the reserved vehicle reserved by the user, that is, that the reference vehicle may be a malicious vehicle. Upon the determination that the time of the detection of the opening of the door of the reference vehicle by the detection unit is not within the prescribed period, the terminal device displays the message, indicating that the reference vehicle is not the reserved vehicle but may be a malicious vehicle, on the display unit. Thus the user may acknowledge that the reference vehicle may be a malicious vehicle, based on the message displayed on the display unit, so that the safety in the use of vehicles by the user may be promoted.

By the suppression of the erroneous boarding of the user into a vehicle other than the reserved vehicle, the wasteful dispatch of the reserved vehicle by the vehicle dispatch server may be reduced and thus the decrease in the usage efficiency for the reserved vehicle may be suppressed.

In a vehicle authentication method according to an embodiment of the disclosure, the terminal device determines whether a second specified period has elapsed or not since the vehicle dispatch server generated the vehicle authenticator of the reserved vehicle and, upon determination that the second specified period has elapsed, displays the message, indicating that the reference vehicle is not the reserved vehicle but may be a malicious vehicle, on the display unit.

Accordingly, the terminal device determines whether the second specified period has elapsed or not since the vehicle dispatch server generated the vehicle authenticator of the reserved vehicle. Upon the determination that the second specified period has elapsed, the terminal device displays the message, indicating that the reference vehicle is not the reserved vehicle but may be a malicious vehicle, on the display unit. In case where the second specified period has elapsed, it is conceivable that the reference vehicle is not the reserved vehicle, that is, that the reference vehicle may be a malicious vehicle. Thus the user may acknowledge that the reference vehicle may be a malicious vehicle, based on the message displayed on the display unit, so that the safety in the use of vehicles by the user may be promoted.

By the suppression of the erroneous boarding of the user into a vehicle other than the reserved vehicle, the wasteful dispatch of the reserved vehicle by the vehicle dispatch server may be reduced and thus the decrease in the usage efficiency for the reserved vehicle may be suppressed.

In a vehicle authentication method according to an embodiment of the disclosure, the vehicle dispatch server calculates predicted arrival time when the reserved vehicle will arrive at the vicinity of the user and transmits information indicating the predicted arrival time to the terminal device and the terminal device determines whether time of arrival of the reference vehicle at the vicinity of the user is within a third specified period including the predicted arrival time or not and, upon determination that the third specified period had elapsed, displays the message, indicating that the reference vehicle is not the reserved vehicle but may be a malicious vehicle, on the display unit.

Accordingly, the vehicle dispatch server calculates the predicted arrival time when the reserved vehicle will arrive at the vicinity of the user and transmits the information indicating the predicted arrival time to the terminal device. The terminal device determines whether the time of the arrival of the reference vehicle at the vicinity of the user is within the third specified period including the predicted arrival time or not and, upon the determination that the third specified period had elapsed, displays the message, indicating that the reference vehicle is not the reserved vehicle but may be a malicious vehicle, on the display unit. In case where the third specified period had elapsed, it is conceivable that the reference vehicle is not the reserved vehicle, that is, that the reference vehicle may be a malicious vehicle. Thus the user may acknowledge that the reference vehicle may be a malicious vehicle, based on the message displayed on the display unit, so that the safety in the use of vehicles by the user may be promoted.

By the suppression of the erroneous boarding of the user into a vehicle other than the reserved vehicle, the wasteful dispatch of the reserved vehicle by the vehicle dispatch server may be reduced and thus the decrease in the usage efficiency for the reserved vehicle may be suppressed.

In a vehicle authentication method according to an embodiment of the disclosure, the terminal device determines whether a signature included in the vehicle authenticator is authentic or not and, upon determination that the signature is not authentic, displays a message, indicating that the reference vehicle is not the reserved vehicle but an incorrect vehicle in which another user is to get, on the display unit or, upon determination that the signature is authentic, displays the message, indicating that the reference vehicle is not the reserved vehicle but may be a malicious vehicle, on the display unit.

Accordingly, the terminal device determines whether the signature is authentic or not. In case where the terminal device determines that the signature is not authentic, it is conceivable that the signature may be a forged signature or the like and the display unit is therefore made to display the message indicating to the user that the reference vehicle may be a malicious vehicle. In case where the terminal device determines that the signature is authentic, it is conceivable that the reference vehicle is such as a reserved vehicle reserved by another user, for instance, and the display unit is therefore made to display the message indicating to the user that the reference vehicle is an incorrect vehicle. It is thus made possible for the user to acknowledge whether the reference vehicle may be an incorrect vehicle or a malicious vehicle. As a result, the safety in the use of vehicles by the user may be promoted.

It should be noted that general or specific aspects may be implemented by a system, a method, an integrated circuit, a computer program, a computer readable recording medium such as a CD-ROM, or any selective combination thereof.

Hereinbelow, the embodiments will be specifically described with reference to the drawings. The embodiments that will be described below each disclose a specific example of the disclosure. Numerical values, shapes, materials, components, layouts and connection configurations of the components, steps, sequence of the steps, and the like mentioned for the embodiments below each offer an example and are not intended to limit the disclosure. The components of the embodiments below that are not mentioned in independent claims providing for the broadest concepts will be described as optional components.

The drawings are schematic diagrams and are not necessarily illustrated so as to be exact. For the drawings, substantially the same configurations are provided with the same reference characters and duplicate description thereon is omitted or simplified.

Hereinbelow, the vehicle authentication methods, the program, the terminal device, and the vehicle authentication system according to the embodiments of the disclosure will be described.

First Embodiment

[Configuration]

Initially, configurations of a vehicle authentication system 1 according to the embodiment will be described with use of FIGS. 1 and 2.

FIG. 1 is a schematic diagram illustrating the vehicle authentication system 1 according to the first embodiment. FIG. 2 is a block diagram illustrating the vehicle authentication system 1 according to the first embodiment.

Figure 2:
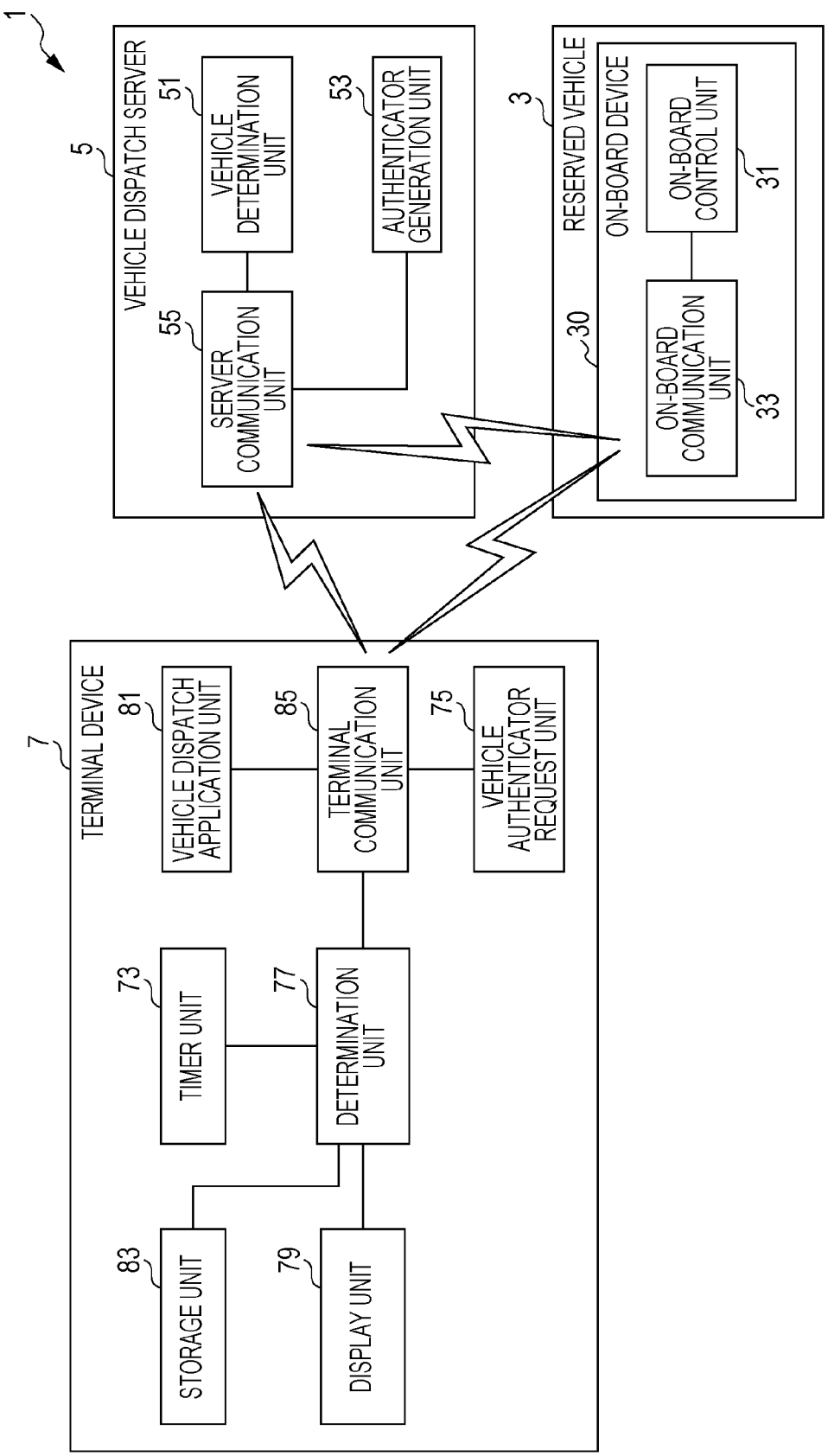
FIG. 2 is a block diagram illustrating the vehicle authentication system according to the first embodiment.

As illustrated in FIGS. 1 and 2, the vehicle authentication system 1 is a system by which a reserved vehicle 3 reserved at a vehicle dispatch server 5 by a user is dispatched to a designated place. In the vehicle authentication system 1, a terminal device 7 authenticates whether a reference vehicle having arrived at a vicinity of the user is the reserved vehicle 3 in which the user is to get in accordance with a reservation or not. The vehicle dispatch server 5 of the vehicle authentication system 1 is a taxi management system for dispatch of taxis, a taxi reservation system, or the like, for instance. In the vehicle authentication system 1, information communication is enabled among the reserved vehicle 3, the terminal device 7 that is used by the user having reserved the taxi, and the vehicle dispatch server 5.

Herein, the user refers to not only a passenger who has reserved vehicle dispatch and who gets on board the reserved vehicle 3 at the designated place but also a passenger who differs from a person having reserved the vehicle dispatch and not intending to board the reserved vehicle 3 and who gets on board the reserved vehicle 3 at the designated place.

The vehicle authentication system 1 includes the reserved vehicle 3, the vehicle dispatch server 5, and the terminal device 7.

The reserved vehicle 3 is a vehicle whose dispatch to the user has been determined by the vehicle dispatch server 5 upon reservation of the vehicle dispatch by the user and in which the user is to get. The reserved vehicle 3 includes an on-board device 30 in which information on the reserved vehicle 3 has been installed.

The on-board device 30 includes an on-board control unit 31 and an on-board communication unit 33.

The on-board control unit 31 is a control device that controls travel of the reserved vehicle 3. When the user reserves the vehicle dispatch at the vehicle dispatch server 5, the on-board control unit 31 receives a vehicle dispatch command for the dispatch of the reserved vehicle 3 determined by the vehicle dispatch server 5 and a vehicle authenticator for authentication of the reserved vehicle 3, from the vehicle dispatch server 5 via the on-board communication unit 33. The on-board control unit 31 rewrites an authenticator of the reserved vehicle 3 into the received new vehicle authenticator. Upon reception of the vehicle dispatch command, the on-board control unit 31 controls an actuator or the like of the vehicle in order to dispatch the reserved vehicle 3 to the designated place in accordance with the vehicle dispatch command. Thus the reserved vehicle 3 moves to the place designated by the user.

When the reserved vehicle 3 arrives at a vicinity of the designated place, the on-board control unit 31 transmits arrival notification via the vehicle dispatch server 5 to the terminal device 7 with use of the on-board communication unit 33. As for timing of transmission of the arrival notification, the arrival notification may be transmitted to the vehicle dispatch server 5 after arrival at the designated place or may be transmitted to the vehicle dispatch server 5 when the reserved vehicle 3 comes to within a specified distance from the designated place, for instance. On this occasion, the vehicle dispatch server 5 is capable of determining whether the reserved vehicle 3 has arrived or not at the vicinity of the designated place, by receiving positional information on the reserved vehicle 3 with use of a function of GPS or the like.

Upon reception of a request for the vehicle authenticator from the terminal device 7, the on-board control unit 31 transmits the vehicle authenticator, received upon determination as the reserved vehicle 3 in a vehicle determination unit 51 of the vehicle dispatch server 5, via the on-board communication unit 33 to the terminal device 7.

The on-board communication unit 33 is an antenna for communication with the terminal device 7 and the vehicle dispatch server 5. The on-board communication unit 33 carries out communication such as reception of the vehicle authenticator generated by the vehicle dispatch server 5 and transmission of the arrival notification to the terminal device 7 upon movement of the reserved vehicle 3 to the designated place.

The vehicle dispatch server 5 is a server that manages the reserved vehicle 3. The vehicle dispatch server 5 dispatches the reserved vehicle 3 to the place designated by the user in response to a request from the user, for instance. The vehicle dispatch server 5 includes the vehicle determination unit 51, an authenticator generation unit 53, and a server communication unit 55.

Upon a reservation of the vehicle dispatch from a user, the vehicle determination unit 51 determines the reserved vehicle 3 that is to be dispatched to the user. The vehicle determination unit 51 generates the vehicle dispatch command for control over the reserved vehicle 3 for the movement of the determined reserved vehicle 3 to the designated place and transmits the vehicle dispatch command via the server communication unit 55 to the reserved vehicle 3.

Upon determination of the reserved vehicle 3 that is to be dispatched to the user, the vehicle determination unit 51 generates message information indicating that the reservation has been completed and transmits the message information via the server communication unit 55 to the terminal device 7. Upon reception of the message information indicating that the reservation has been completed, the terminal device 7 displays a message, indicating that the reservation designated in the message information has been completed, on a display unit 79.

The authenticator generation unit 53 generates the vehicle authenticator for the authentication of the reserved vehicle 3 determined by the vehicle determination unit 51. The vehicle authenticator is an authenticator that is determined from temporary random numbers and is associated with a user ID for identification of the user who is to get in the reserved vehicle 3. The authenticator generation unit 53 acquires time information from a timer unit built in the vehicle dispatch server 5 and provides the vehicle authenticator with the time information indicating time when the vehicle authenticator was generated. The user ID is an identifier for the identification of the user.

The authenticator generation unit 53 transmits the vehicle authenticator which is associated with the user ID and to which the time information has been added, via the server communication unit 55 to the terminal device 7 and the reserved vehicle 3. The terminal device 7 and the reserved vehicle 3 each receive and retain the vehicle authenticator for the authentication of the reserved vehicle 3, from the vehicle dispatch server 5.

The server communication unit 55 is an antenna for communication through which communication with the reserved vehicle 3 and the terminal device 7 is carried out. The server communication unit 55 carries out the communication such as reception of a vehicle dispatch request from the terminal device 7 and transmission of a reservation authenticator and the vehicle dispatch command to the reserved vehicle 3.

The terminal device 7 is terminal equipment, such as a smartphone and a tablet terminal, that is used for the reservation of the vehicle dispatch at the vehicle dispatch server 5 by a user. The terminal device 7 includes a timer unit 73, a vehicle authenticator request unit 75, a determination unit 77, the display unit 79, a vehicle dispatch application unit 81, a storage unit 83, and a terminal communication unit 85.

When the user reserves the vehicle dispatch at the vehicle dispatch server 5, the vehicle dispatch application unit 81 sends the vehicle dispatch request via the terminal communication unit 85 to the vehicle dispatch server 5. When sending the vehicle dispatch request to the vehicle dispatch server 5, the vehicle dispatch application unit 81 also transmits the user ID for the authentication of the user via the terminal communication unit 85 to the vehicle dispatch server 5.

The timer unit 73 measures time and notifies the determination unit 77 of the time. The timer unit 73 transmits time information for every unit time to the determination unit 77, for instance. It is thus made possible for the determination unit 77 to determine whether a first specified period that will be described later has elapsed or not. Specifically, the timer unit 73 may be a general-purpose timer circuit.

The vehicle authenticator request unit 75 sends the reference vehicle a request for a vehicle authenticator by which whether the reference vehicle is the reserved vehicle 3 or not is to be authenticated and which is retained by the reference vehicle for the authentication of the reference vehicle. In case where the reference vehicle retains the vehicle authenticator, the reference vehicle transmits the vehicle authenticator of the reference vehicle to the terminal device 7. The vehicle authenticator request unit 75 is an example of the request unit. The request for the vehicle authenticator may be attained through recognition of a license plate, an IC chip, or the like of the reference vehicle by the user with use of the terminal device 7, for instance.

Upon reception of the arrival notification via the terminal communication unit 85, the determination unit 77 announces that the reserved vehicle 3 has arrived at the vicinity of the user. For instance, the terminal device 7 announces to the user that the reserved vehicle 3 has arrived, by display on the display unit 79, emission of sounds from a speaker or the like, or vibrations with use of a vibration function or the like. Thus the user authenticates whether the reference vehicle is the reserved vehicle 3 or not, with use of the terminal device 7.

The determination unit 77 determines whether the reference vehicle having arrived at the vicinity of the user is the reserved vehicle 3 reserved by the user or not, for instance. Specifically, the determination unit 77 determines whether the vehicle authenticator of the reserved vehicle 3 received from the vehicle dispatch server 5 coincides with the vehicle authenticator of the reference vehicle received from the reference vehicle or not. In addition, the determination unit 77 determines whether there has been any response to the request to the reference vehicle or not within the first specified period after the request for the vehicle authenticator to the reference vehicle. That is, in case where the determination unit 77 determines that the first specified period had elapsed before reception of the response from the reference vehicle even if the determination unit 77 determines that the vehicle authenticator of the reserved vehicle 3 received from the vehicle dispatch server 5 coincides with the vehicle authenticator received from the reference vehicle, the determination unit 77 determines that the reference vehicle is not the reserved vehicle 3. That is, in case where there has been no response of the vehicle authenticator from the reference vehicle, it is impossible to determine coincidence or discrepancy between the vehicle authenticator of the reference vehicle and the vehicle authenticator of the reserved vehicle 3 and then it is conceivable that the reference vehicle is not the reserved vehicle 3 or the received vehicle authenticator has low reliability, for instance. The determination unit 77 then causes a message generation unit not illustrated to generate message information indicating that the reference vehicle is not the reserved vehicle 3 and causes the display unit 79 to display a message indicating that the reference vehicle is not the reserved vehicle 3, through a display control unit not illustrated.

Specifically, upon determination that the vehicle authenticator of the reserved vehicle 3 received from the vehicle dispatch server 5 does not coincide with the vehicle authenticator received from the reference vehicle, the determination unit 77 determines that the reference vehicle is not the reserved vehicle 3. It is then conceivable that the reference vehicle is an incorrect vehicle, such as a reserved vehicle reserved by another user, which is not the reserved vehicle 3 reserved by the user. Herein, the incorrect vehicle is another reserved vehicle that is not the reserved vehicle 3 reserved by the user and that has been reserved by another user, for instance. The determination unit 77 causes the message generation unit to generate the message information indicating that the reference vehicle is not the reserved vehicle 3 and causes the display unit 79 to display the message indicating that the reference vehicle is not the reserved vehicle 3, through the display control unit.

In case where the determination unit 77 determines that the vehicle authenticator of the reserved vehicle 3 received from the vehicle dispatch server 5 coincides with the vehicle authenticator received from the reference vehicle and determines that the vehicle authenticator received from the reference vehicle is within the first specified period, the determination unit 77 determines that the reference vehicle is the reserved vehicle 3. Provided that the reference vehicle is the reserved vehicle 3, it can be said that the reference vehicle is the correct vehicle reserved by the user at the vehicle dispatch server 5. Upon determination that the reference vehicle is the reserved vehicle 3, the determination unit 77 causes the message generation unit not illustrated to generate message information indicating that the reference vehicle is the reserved vehicle 3 in which the user may get and causes the display unit 79 to display a message indicating that the reference vehicle is the reserved vehicle 3 in which the user may get, through the display control unit not illustrated.

The display unit 79 displays the message indicating that user may get in the vehicle, the message indicating that the reference vehicle is not the reserved vehicle 3, or the like. The display unit 79 is a monitor such as a liquid crystal display, an LED display, or an organic light emitting display, for instance. The message indicating that the user may get in the vehicle is such as "This is the vehicle you have reserved. Please get in." As the message indicating that the reference vehicle is not the reserved vehicle 3, a message indicating that the reserved vehicle 3 is an incorrect vehicle is such as "This is not the vehicle you have reserved. You may not get in." and a message indicating that the reference vehicle may be a malicious vehicle is such as "WARNING! This vehicle may be malicious."

The storage unit 83 is a memory that acquires and stores the vehicle authenticator for the authentication of the reserved vehicle 3. Specifically, the storage unit 83 receives and stores the vehicle authenticator of the reserved vehicle 3 determined by the vehicle dispatch server 5 and the vehicle authenticator of the reference vehicle.

The terminal communication unit 85 is an antenna for communication through which communication with the reserved vehicle 3 and the vehicle dispatch server 5 is carried out. The terminal communication unit 85 carries out the communication such as the request for the vehicle authenticator to the reference vehicle and reception of the vehicle authenticator from the reference vehicle.

[Operation]

Subsequently, operations in the vehicle authentication system 1 in the embodiment will be described.

Figure 3:
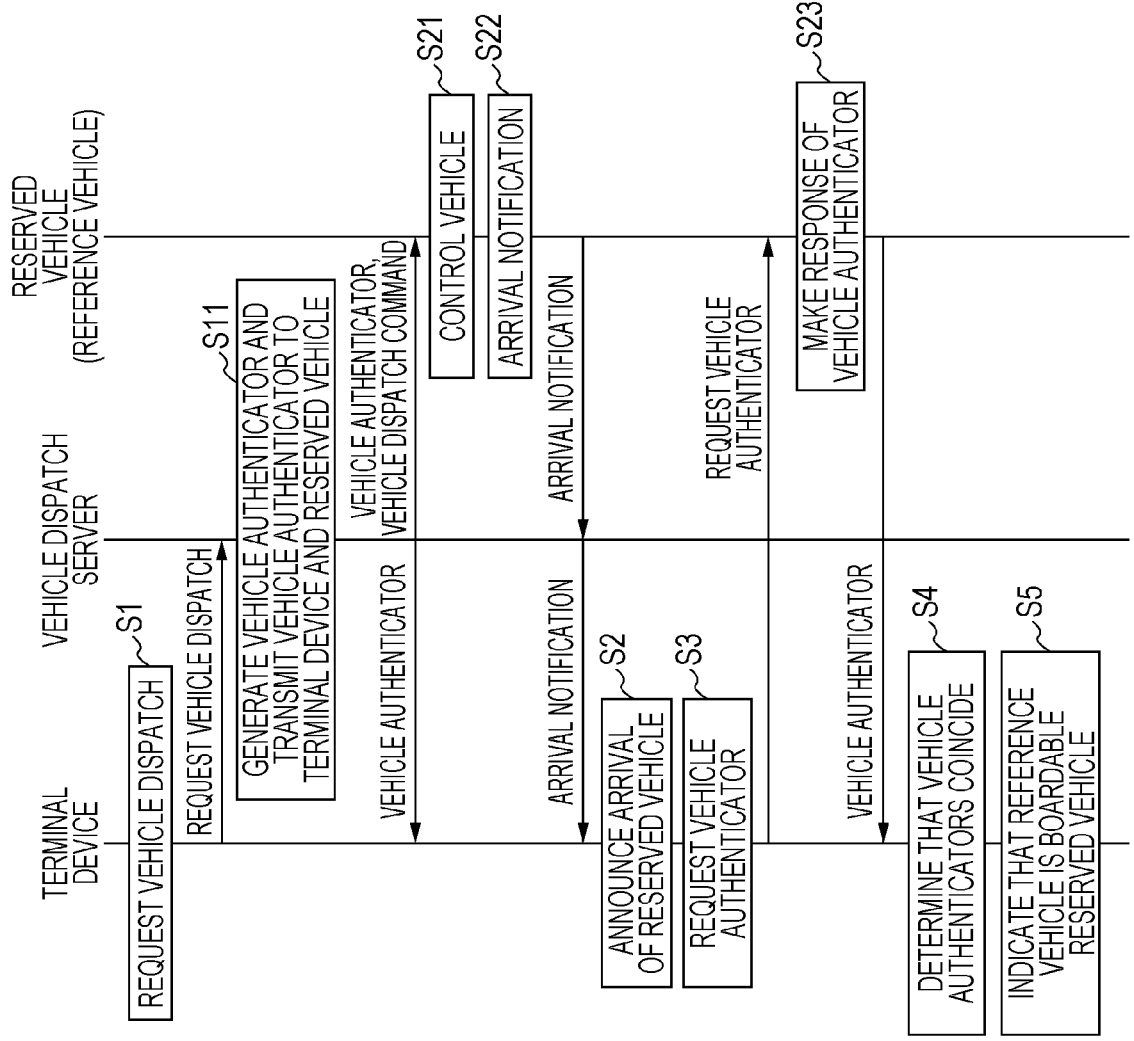
FIG. 3 is a sequence diagram illustrating a case in which a reference vehicle is a reserved vehicle in the vehicle authentication system according to the first embodiment.
Figure 5:
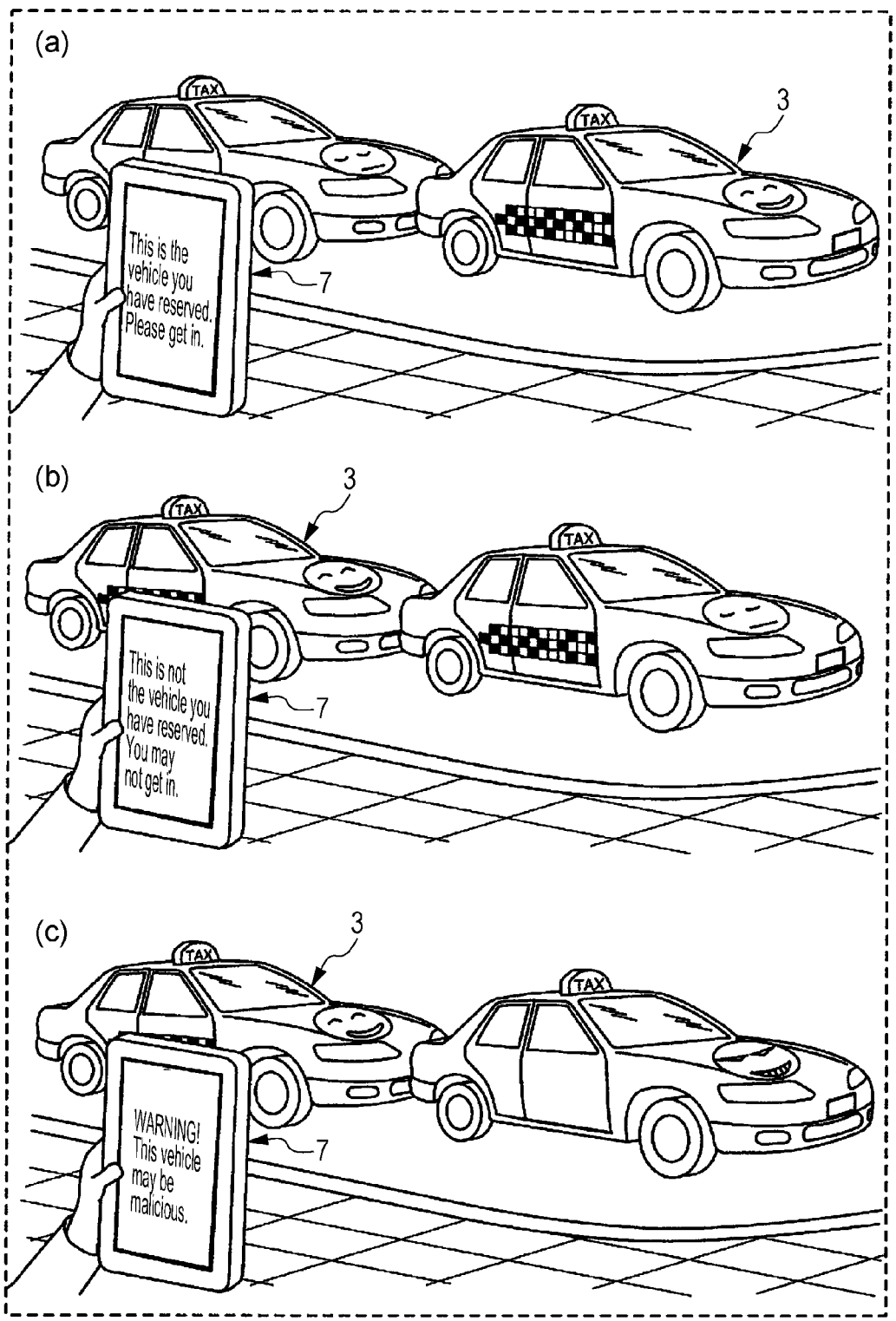
FIG. 5 illustrates schematic diagrams illustrating states of authentication of reference vehicles in the vehicle authentication system according to the first embodiment.

FIG. 3 is a sequence diagram illustrating a case in which the reference vehicle is the reserved vehicle 3 in the vehicle authentication system 1 according to the first embodiment. FIG. 3 illustrates the case in which the reference vehicle is the reserved vehicle 3, as an example. FIG. 5 illustrates schematic diagrams illustrating states of the authentication of the reference vehicle in the vehicle authentication system 1 according to the first embodiment. FIG. 5(a) shows that the reference vehicle is the reserved vehicle 3. FIG. 5(b) merely shows that the reference vehicle is not the reserved vehicle 3.

As illustrated in FIG. 3, the user initially makes the terminal device 7 boot up a dedicated application for the reservation of the vehicle dispatch. The user sends the vehicle dispatch request to the vehicle dispatch server 5 in order that a vehicle may be dispatched to the user. Specifically, the vehicle dispatch application unit 81 of the terminal device 7 sends the vehicle dispatch request via the terminal communication unit 85 to the vehicle dispatch server 5 (S1). Then the user ID of the user, together with the vehicle dispatch request, is transmitted to the vehicle dispatch server 5.

Subsequently, the vehicle dispatch server 5 receives the vehicle dispatch request and the user ID. The vehicle dispatch server 5 determines a reserved vehicle 3 that is to be dispatched to the user and generates the vehicle authenticator that is to be transmitted to the reserved vehicle 3 (S11). Specifically, the vehicle determination unit 51 determines the reserved vehicle 3 that is to be dispatched to the user. The authenticator generation unit 53 generates the vehicle authenticator for the authentication of the reserved vehicle 3 determined by the vehicle determination unit 51 and associates the user ID with the generated vehicle authenticator. The authenticator generation unit 53 transmits the vehicle authenticator with which the user ID is associated and to which the time information indicating the time when the vehicle authenticator was generated has been added, via the server communication unit 55 to the terminal device 7 and the reserved vehicle 3 (S11). The terminal device 7 and the reserved vehicle 3 each receive and retain the vehicle authenticator for the authentication of the reserved vehicle 3 from the vehicle dispatch server 5 before the determination unit 77 makes determination in step S4 that will be described later. The vehicle determination unit 51 of the vehicle dispatch server 5 generates the vehicle dispatch command for the reserved vehicle 3 that is to be dispatched to the user and transmits the vehicle dispatch command via the server communication unit 55 to the reserved vehicle 3 (S11). When transmitting the vehicle authenticator to the terminal device 7, the vehicle determination unit 51 generates the message information indicating that the reservation has been completed and transmits the message information indicating that the reservation has been completed, via the server communication unit 55 to the terminal device 7.

In case where there is no vehicle that may be dispatched, the vehicle dispatch server 5 may transmit message information indicating that the reservation has not been completed, message information indicating that the reservation should be requested again after an interval, or the like.

Subsequently, the on-board control unit 31 in the reserved vehicle 3 receives the vehicle dispatch command and the vehicle authenticator via the on-board communication unit 33. The on-board control unit 31 rewrites the authenticator of the reserved vehicle 3 into the received new vehicle authenticator. The on-board control unit 31 controls the actuator of the vehicle in order to dispatch the reserved vehicle 3 to the designated place in accordance with the vehicle dispatch command (S21). Thus the reserved vehicle 3 moves to the designated place.

When the arrival at the vicinity of the designated place is detected from the positional information with use of GPS or the like, subsequently, the on-board control unit 31 sends the arrival notification via the vehicle dispatch server 5 to the terminal device 7 (S22).

Upon the reception of the arrival notification via the terminal communication unit 85, subsequently, the determination unit 77 of the terminal device 7 announces that the reserved vehicle 3 has arrived at the vicinity of the user (S2). For instance, the terminal device 7 announces to the user that the reserved vehicle 3 has arrived, by the display on the display unit 79, the emission of sounds from the speaker or the like, or the vibrations with use of the vibration function or the like.

Subsequently, the user holds the terminal device 7 over the reference vehicle and carries out a specified operation in order to confirm whether the reference vehicle having arrived at the vicinity of the user is the reserved vehicle 3 or not. Specifically, the vehicle authenticator request unit 75 of the terminal device 7 requests the vehicle authenticator that is for the authentication of whether the reference vehicle is the reserved vehicle 3 or not and that is retained by the reference vehicle (S3).

Subsequently, the on-board control unit 31 in the reference vehicle receives the request for the vehicle authenticator and makes a response to the reception from the vehicle dispatch server 5 in step S11, as a response to the request. That is, the on-board control unit 31 transmits the vehicle authenticator, received from the vehicle dispatch server 5 in step S11, to the terminal device 7 (S23).

Subsequently, the determination unit 77 determines whether the vehicle authenticator of the reserved vehicle 3 received in step S11 coincides with the vehicle authenticator received from the reference vehicle in step S23 or not. In FIG. 3, because the reference vehicle is the reserved vehicle 3, the determination unit 77 determines that the vehicle authenticator of the reserved vehicle 3 received in step S11 coincides with the vehicle authenticator received from the reference vehicle in step S23 (S4).

As illustrated in FIGS. 3 and 5(*a*), the determination unit 77 subsequently causes the display unit 79 to display the message indicating that the reference vehicle is the reserved vehicle 3 in which the user may get (S5). Then the determination unit 77 ends this flow.

Figure 4:
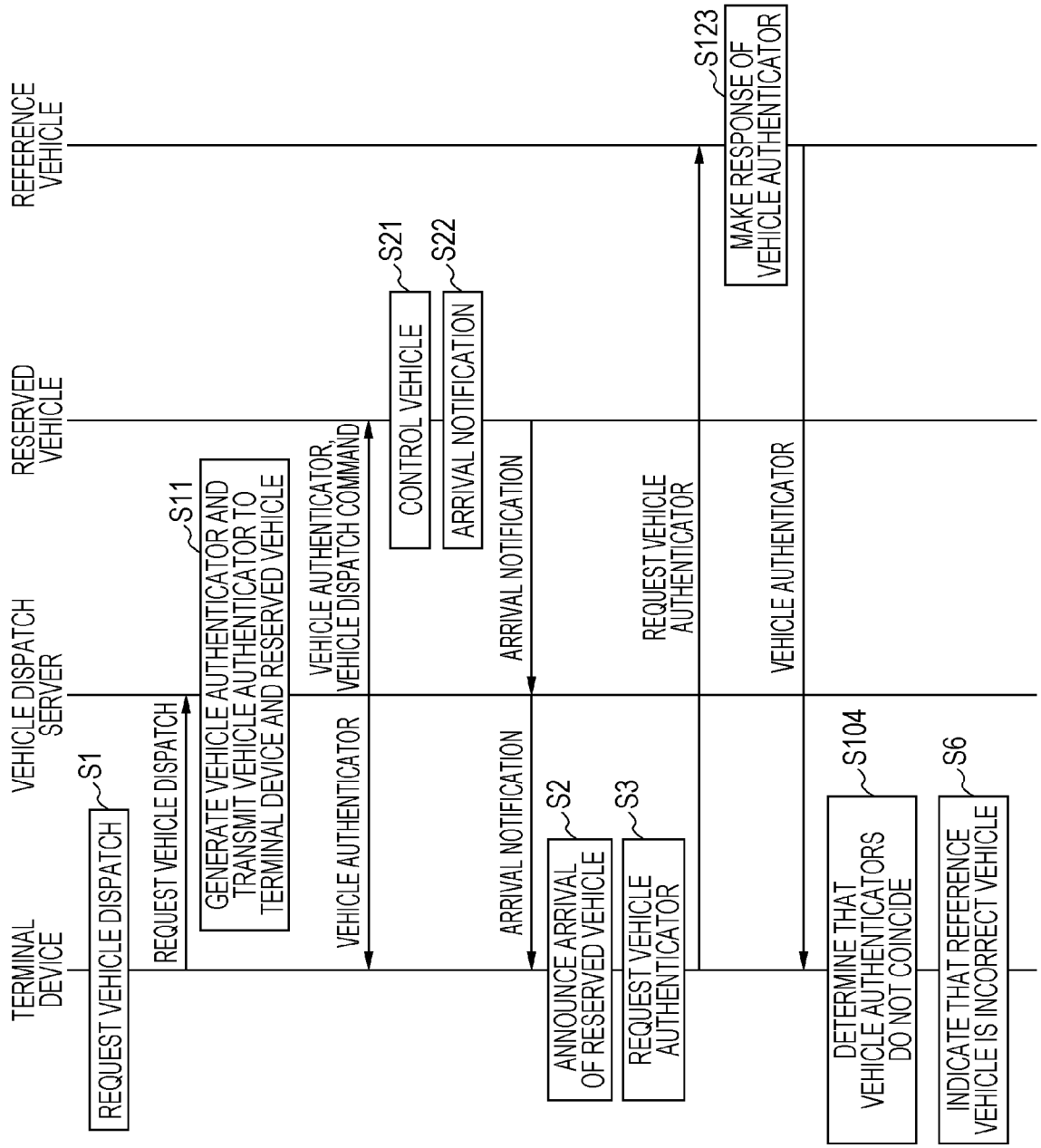
FIG. 4 is a sequence diagram illustrating a case in which a reference vehicle is not the reserved vehicle in the vehicle authentication system according to the first embodiment.

FIG. 4 is a sequence diagram illustrating a case in which the reference vehicle is not the reserved vehicle 3 in the vehicle authentication system 1 according to the first embodiment. FIG. 4 illustrates the case in which the reference vehicle is an incorrect vehicle that is not the reserved vehicle 3, as an example. Description on flows that are the same as those of FIG. 3 is omitted.

As illustrated in FIG. 4, after the terminal device 7 makes the vehicle dispatch request (S1), the vehicle dispatch server 5 generates the vehicle authenticator and transmits the vehicle authenticator to the reserved vehicle 3 and the terminal device 7 (S11). Subsequently, the on-board control unit 31 controls the reserved vehicle 3 so as to dispatch the reserved vehicle 3 to the designated place (S21) and sends the arrival notification via the vehicle dispatch server 5 to the terminal device 7 (S22). The terminal device 7 announces to the user that the reserved vehicle 3 has arrived (S2).

Subsequently, the user holds the terminal device 7 over the reference vehicle and carries out the specified operation in order to confirm whether the reference vehicle having arrived at the vicinity of the user is the reserved vehicle 3 or not. Specifically, the vehicle authenticator request unit 75 of the terminal device 7 requests the vehicle authenticator that is for the authentication of whether the reference vehicle is the reserved vehicle 3 or not and that is retained by the reference vehicle (S3). The reference vehicle makes a response with the vehicle authenticator to the terminal device 7 (S123).

Subsequently, the determination unit 77 determines whether the vehicle authenticator of the reserved vehicle 3 received in step S11 coincides with the vehicle authenticator received from the reference vehicle in step S123 or not. In FIG. 4, because the reference vehicle is an incorrect vehicle, the determination unit 77 determines that the vehicle authenticator of the reserved vehicle 3 received in step S11 does not coincide with the vehicle authenticator received from the reference vehicle in step S123 (S104).

The reference vehicle is the incorrect vehicle in FIG. 4 and, as illustrated in FIGS. 4 and 5(*b*), the determination unit 77 thus causes the display unit 79 to display a message merely indicating that the reference vehicle is not the reserved vehicle 3 in order that the user may not get in the reference vehicle. Specifically, in case where the vehicle authenticator received from the reference vehicle in step S123 is not coincident, it is conceivable that the reference vehicle is such as a reserved vehicle reserved by another user, for instance, and the determination unit 77 thus causes the display unit 79 to display the message indicating to the user that the reference vehicle is an incorrect vehicle (S6). Then the determination unit 77 ends this flow.

It is thus made possible for the user to acknowledge whether the reference vehicle is the reserved vehicle 3 reserved by the user or another vehicle in accordance with contents displayed on the display unit 79. As a result, the user may mitigate problems such as boarding into a vehicle other than the reserved vehicle 3.

Subsequently, operations in a case where the reference vehicle is a malicious vehicle and where there has been no response of the vehicle authenticator from the reference vehicle despite the request for the vehicle authenticator from the terminal device 7 to the reference vehicle in the vehicle authentication system 1 of the embodiment will be described.

Figure 6:
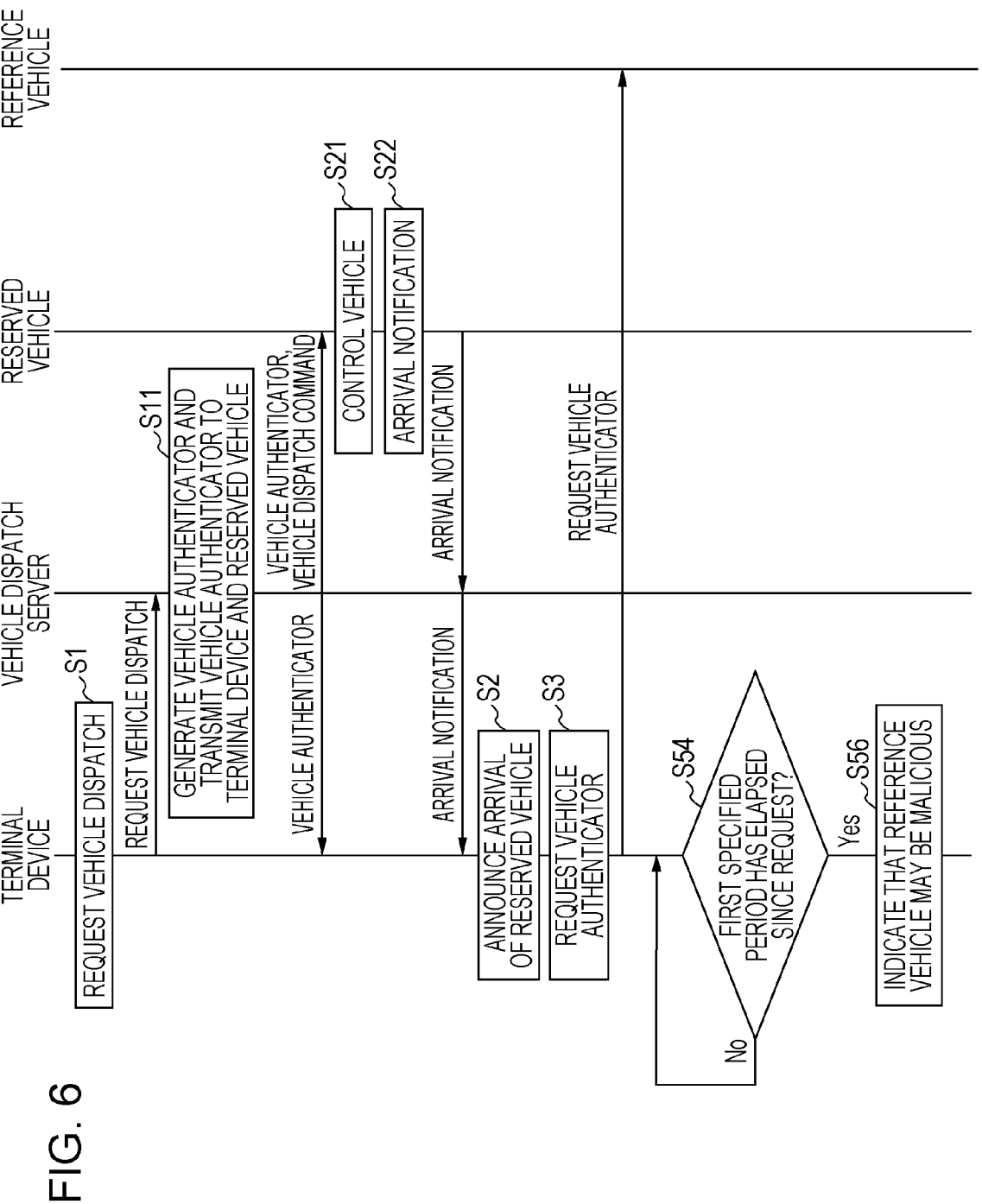
FIG. 6 is a sequence diagram illustrating a case in which a reference vehicle is a malicious vehicle in the vehicle authentication system according to the first embodiment.

FIG. 6 is a sequence diagram illustrating the case in which the reference vehicle is a malicious vehicle in the vehicle authentication system according to the first embodiment.

As illustrated in FIG. 6, after the terminal device 7 makes the vehicle dispatch request (S1), the vehicle dispatch server 5 generates the vehicle authenticator and transmits the vehicle authenticator to the reserved vehicle 3 and the terminal device 7 (S11). Subsequently, the on-board control unit 31 controls the reserved vehicle 3 so as to dispatch the reserved vehicle 3 to the designated place (S21) and sends the arrival notification via the vehicle dispatch server 5 to the terminal device 7 (S22). The terminal device 7 announces to the user that the reserved vehicle 3 has arrived (S2).

Subsequently, the user holds the terminal device 7 over the reference vehicle and carries out the specified operation in order to confirm whether the reference vehicle having arrived at the vicinity of the user is the reserved vehicle 3 or not. Specifically, the vehicle authenticator request unit 75 of the terminal device 7 requests the vehicle authenticator that is for the authentication of whether the reference vehicle is the reserved vehicle 3 or not and that is retained by the reference vehicle (S3).

The determination unit 77 determines whether the reference vehicle is the reserved vehicle 3 or not. Specifically, the determination unit 77 determines whether the first specified period has elapsed since the request for the vehicle authenticator was send or not (S54). In FIG. 6, because the reference vehicle is not the reserved vehicle 3 but the malicious vehicle, no response is returned from the reference vehicle. Therefore, the determination unit 77 goes back to step S54 and carries out the same determination until elapse of the first specified period (No in S54).

As illustrated in FIGS. 6 and 5(*c*), when the determination unit 77 determines that the first specified period has elapsed since the request for the vehicle authenticator (Yes in S54), the determination unit 77 causes the display unit 79 to display the message indicating that the reference vehicle may be a malicious vehicle (S56). Then the determination unit 77 ends this flow.

[Function Effect]

Subsequently, function effects of the vehicle authentication method, the program, the terminal device 7, and the vehicle authentication system 1 according to the embodiment will be described.

In the vehicle authentication method according to the embodiment, as described above, the terminal device 7 acquires the vehicle authenticator for the authentication of the reserved vehicle 3 and, when the reference vehicle meets the request from the terminal device 7, the terminal device 7 acquires the vehicle authenticator of the reference vehicle from the reference vehicle. The terminal device 7 determines whether the vehicle authenticator of the reference vehicle coincides with the vehicle authenticator of the reserved vehicle 3 or not. Upon determination that the vehicle authenticator of the reference vehicle coincides with the vehicle authenticator of the reserved vehicle 3, the terminal device 7 displays the message, indicating that the reference vehicle is the reserved vehicle 3, on the display unit 79. Upon the determination that the vehicle authenticator of the reference vehicle does not coincide with the vehicle authenticator of the reserved vehicle 3, the terminal device 7 displays the message, indicating that the reference vehicle is not the reserved vehicle 3, on the display unit 79.

Thus security level on the authentication of the reference vehicle by the user may be raised.

Particularly, the vehicle authentication method may promote safety in use of vehicles because the user may recognize the message indicating that the reference vehicle is the reserved vehicle 3 and the message indicating that the reference vehicle is not the reserved vehicle 3.

In the program, the terminal device 7, and the vehicle authentication system 1 that make a computer execute the vehicle authentication method according to the embodiment, function effects similar to those of the vehicle authentication method may be achieved.

In the vehicle authentication method according to the embodiment, the vehicle dispatch server 5 generates the vehicle authenticator for the authentication of the reserved vehicle 3. The terminal device 7 and the reserved vehicle 3 each receive and retain the vehicle authenticator, generated by the vehicle dispatch server 5 for the authentication of the reserved vehicle 3, from the vehicle dispatch server 5 before the terminal device 7 determines whether the vehicle authenticator of the reference vehicle coincides with the vehicle authenticator of the reserved vehicle 3 or not. Thus the terminal device 7 is capable of receiving the vehicle authenticator of the reserved vehicle 3 from the vehicle dispatch server 5 each time the vehicle dispatch server 5 generates the vehicle authenticator of the reserved vehicle 3. Therefore, the security level on the authentication of the reference vehicle by the user may be raised by generation of the vehicle authenticator of the reserved vehicle 3 by the vehicle dispatch server 5 with use of random numbers, for instance.

In the vehicle authentication method according to the embodiment, additionally, the terminal device 7 determines whether there has been any response to the request to the reference vehicle or not within the first specified period after the request for the vehicle authenticator to the reference vehicle. Upon determination that the first specified period had elapsed before the reception of the response, the terminal device 7 displays the message, indicating that the reference vehicle is not the reserved vehicle 3 but may be a malicious vehicle, on the display unit 79. In case where the first specified period had elapsed, it is conceivable that the reference vehicle is not the reserved vehicle 3, that is, that the reference vehicle may be a malicious vehicle. Thus the user may acknowledge that the reference vehicle may be a malicious vehicle, based on the message displayed on the display unit 79, so that the safety in the use of vehicles by the user may be promoted.

By suppression of erroneous boarding of the user into a vehicle other than the reserved vehicle 3, furthermore, wasteful dispatch of the reserved vehicle 3 by the vehicle dispatch server 5 may be reduced and thus decrease in usage efficiency for the reserved vehicle 3 may be suppressed.

Modification of First Embodiment

[Configuration]

Configurations of a vehicle authentication system 1a according to the modification will be described with use of FIG. 7.

Figure 7:
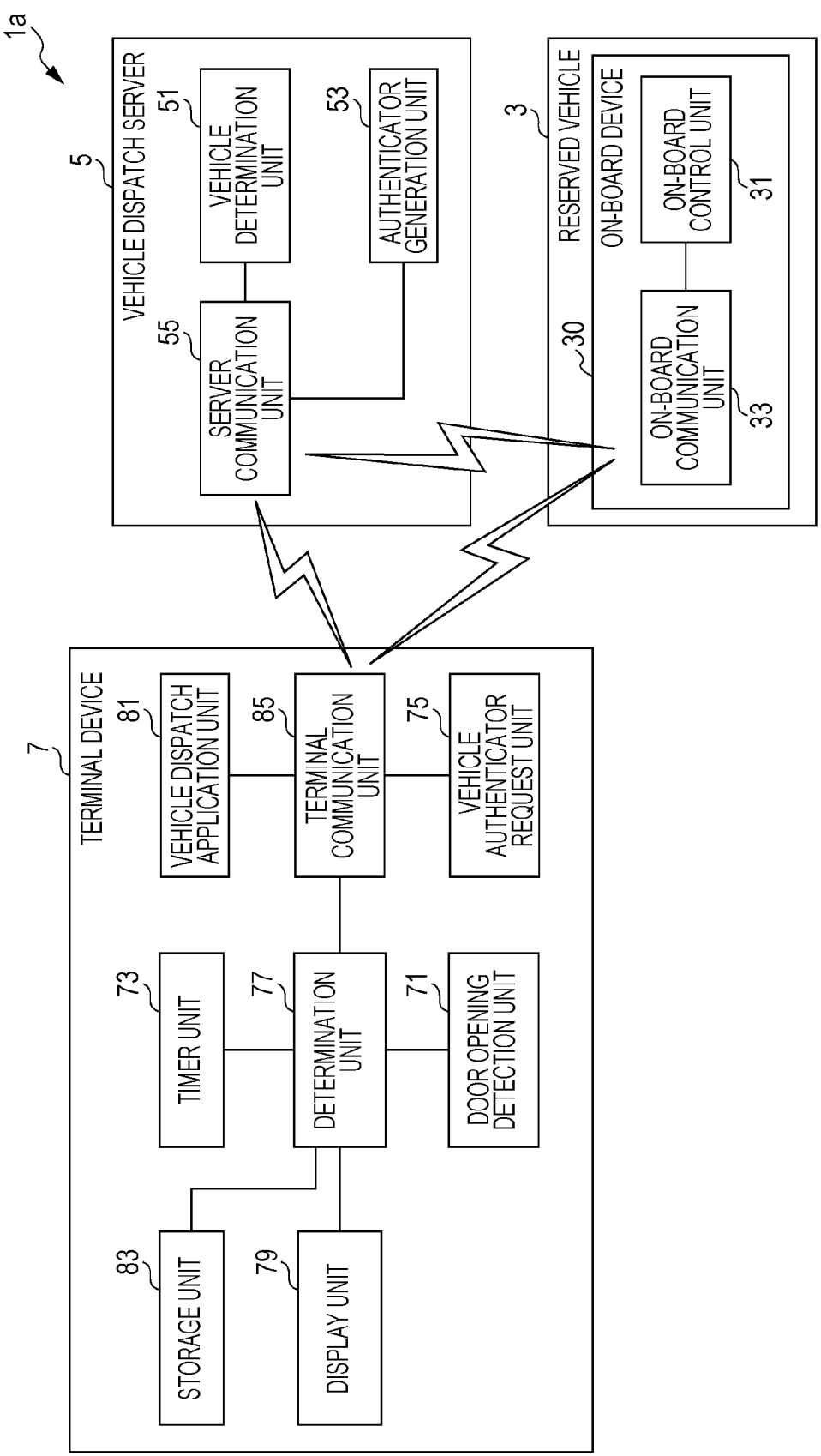
FIG. 7 is a block diagram illustrating a vehicle authentication system according to a modification of the first embodiment.

FIG. 7 is a block diagram illustrating the vehicle authentication system 1a according to the modification of the first embodiment.

The modification differs from the first embodiment in that the terminal device 7 further includes a door opening detection unit 71. The vehicle authentication system 1a of the modification is similar to the first embodiment except for especially described elements. The same configurations as those of the first embodiment are provided with the same reference characters and detailed description on the configurations is omitted.

As illustrated in FIG. 7, the terminal device 7 includes the door opening detection unit 71 in addition to the timer unit 73, the vehicle authenticator request unit 75, the determination unit 77, the display unit 79, the vehicle dispatch application unit 81, the storage unit 83, and the terminal communication unit 85.

The door opening detection unit 71 is a sensor that detects opening of a door of the reference vehicle. The door opening detection unit 71 may be a microphone to collect sounds made upon the opening of the door of the reference vehicle, a camera to image the door of the reference vehicle, or the like that is installed in the terminal device 7, for instance. The door opening detection unit 71 transmits information indicating the detected sounds, images, or the like to the determination unit 77, and the determination unit 77 determines that the door of the reference vehicle has been opened, based on the information. The door opening detection unit 71 is an example of the detection unit.

The determination unit 77 determines whether time when the door opening detection unit 71 detects the opening of the door of the reference vehicle is within a prescribed period preceding the reception of the response or not. Upon determination that the time when the door opening detection unit 71 detects the opening was not within the prescribed period, the determination unit 77 causes the message generation unit to generate the message information indicating that the reference vehicle is not the reserved vehicle 3 and causes the display unit 79 to display the message indicating that the reference vehicle is not the reserved vehicle 3, through the display control unit. Specifically, in case where the door opening detection unit 71 detects that the door of the reference vehicle has been opened in a period other than the prescribed period, it is estimated that the reference vehicle having arrived at front of the user may have malice such as intention to take away the user. Therefore, the determination unit 77 causes the message generation unit to generate message information indicating that the reference vehicle may be a malicious vehicle and causes the display unit 79 to display the message indicating that the reference vehicle may be a malicious vehicle, through the display control unit not illustrated.

[Operation]

Subsequently, operations in the vehicle authentication system 1a in the modification will be described with use of FIG. 8 and the like.

Figure 8:
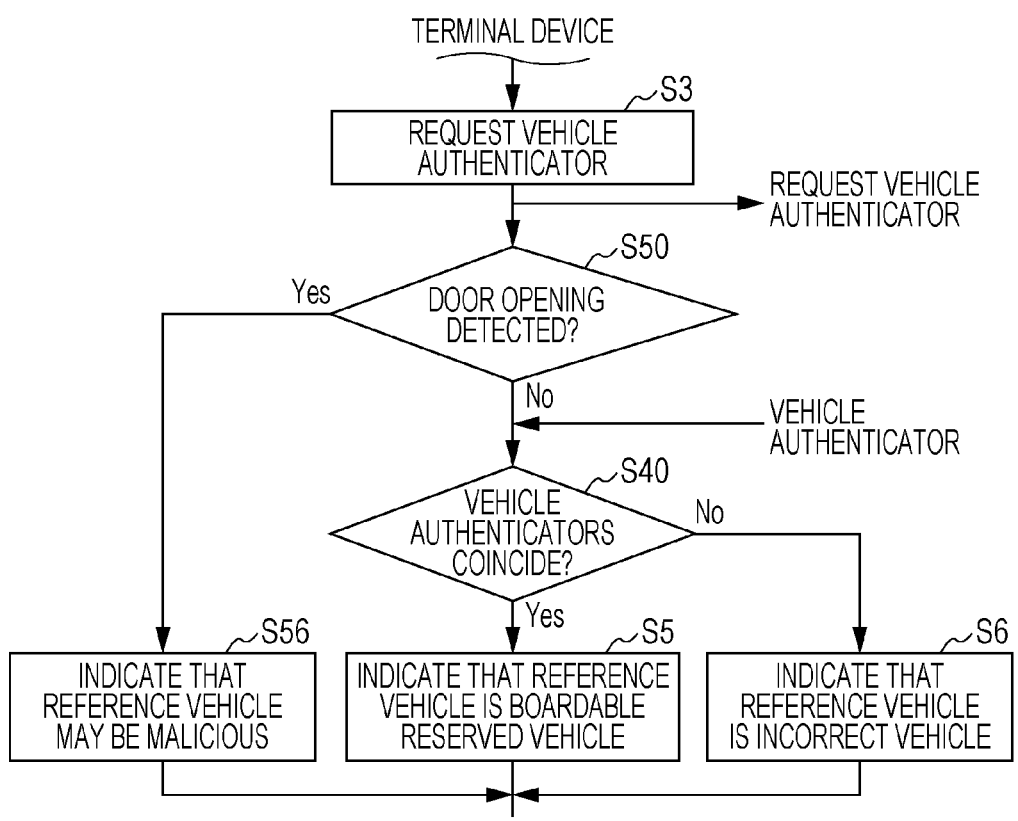
FIG. 8 is a portion of a sequence diagram illustrating operations in the vehicle authentication system, including a door opening detection unit, according to the modification of the first embodiment.

FIG. 8 is a portion of a sequence diagram illustrating the operations in the vehicle authentication system 1a, including the door opening detection unit 71, according to the modification of the first embodiment. Description on flows that are the same as those of FIGS. 3 and 4 is omitted.

As illustrated in FIGS. 3 and 4, after the terminal device 7 makes the vehicle dispatch request (S1), the vehicle dispatch server 5 generates the vehicle authenticator and transmits the vehicle authenticator to the reserved vehicle 3 and the terminal device 7 (S11). Subsequently, the on-board control unit 31 controls the reserved vehicle 3 so as to dispatch the reserved vehicle 3 to the designated place (S21) and sends the arrival notification via the vehicle dispatch server 5 to the terminal device 7 (S22). The terminal device 7 announces to the user that the reserved vehicle 3 has arrived (S2).

Subsequently, the user holds the terminal device 7 over the reference vehicle and carries out the specified operation in order to confirm whether the reference vehicle having arrived at the vicinity of the user is the reserved vehicle 3 or not. Specifically, as illustrated in FIG. 8, the vehicle authenticator request unit 75 of the terminal device 7 requests the vehicle authenticator that is for the authentication of whether the reference vehicle is the reserved vehicle 3 or not and that is retained by the reference vehicle (S3). The reference vehicle makes a response with the vehicle authenticator to the terminal device 7 (S23).

Subsequently, the determination unit 77 determines whether the time when the door opening detection unit 71 detected the opening of the door of the reference vehicle was within the prescribed period or not (S50). The prescribed period is a period that elapsed since the vehicle authenticator request unit 75 requested the vehicle authenticator from the reference vehicle in step S3 and until the vehicle authenticator request unit 75 acquired the vehicle authenticator from the reference vehicle. In case where the door of the reference vehicle is opened before the reception of the response with the vehicle authenticator in step S23 of FIG. 3 or step S123 of FIG. 4, that is, in case where the door opening detection unit 71 detects the opening of the door of the reference vehicle before it is authenticated whether the reference vehicle is the reserved vehicle 3 or not, it is estimated that the opening of the door of the reference vehicle may have the malice such as the intention to take away the user. The determination in step S50 may be iterated during the prescribed period till the reception of the vehicle authenticator from the reference vehicle.

In case where the door opening detection unit 71 has detected the opening of the door of the reference vehicle before it is authenticated whether the reference vehicle is the reserved vehicle 3 or not (before step S40), that is, in case where the door opening detection unit 71 has detected the opening of the door of the reference vehicle in the prescribed period (Yes in S50), the determination unit 77 causes the display unit 79 to display the message indicating that the reference vehicle may be a malicious vehicle (S56). In case where the door of the reference vehicle is opened in a period other than the prescribed period, for instance, it is estimated that the reference vehicle having arrived at the front of the user may have the malice such as the intention to take away the user.

On the other hand, in case where the door opening detection unit 71 has not detected any opening of the door of the reference vehicle before it is authenticated whether the reference vehicle is the reserved vehicle 3 or not, that is, in case where the door opening detection unit 71 has not detected any opening of the door of the reference vehicle within the prescribed period (No in S50), the determination unit 77 determines whether the vehicle authenticator of the reserved vehicle 3 received in step S11 coincides with the vehicle authenticator received from the reference vehicle in step S23 in FIG. 3 or step S123 in FIG. 4 or not (S40).

As illustrated in FIGS. 8 and 5(*a*), upon subsequent determination that the vehicle authenticator of the reserved vehicle 3 received in step S11 in FIGS. 3 and 4 coincides with the vehicle authenticator received from the reference vehicle in step S23 in FIG. 3 or step S123 in FIG. 4 (Yes in S40), the determination unit 77 causes the display unit 79 to display the message indicating that the reference vehicle is the reserved vehicle 3 in which the user may get (S5). Then the determination unit 77 ends this flow.

On the other hand, upon determination that the vehicle authenticator of the reserved vehicle 3 received in step S11 in FIGS. 3 and 4 does not coincide with the vehicle authenticator received from the reference vehicle in step S23 in FIG. 3 or step S123 in FIG. 4 (No in S40), the determination unit 77 causes the display unit 79 to display the message indicating to the user that the reference vehicle is an incorrect vehicle (S6). Then the determination unit 77 ends this flow.

Upon determination that the time when the door opening detection unit 71 detected the opening of the door of the reference vehicle was within the prescribed period (Yes in S50), the determination unit 77 causes the display unit 79 to display the message indicating that the reference vehicle may be a malicious vehicle. Then the determination unit 77 ends this flow.

[Function Effect]

Subsequently, function effects of a vehicle authentication method in the modification will be described.

In the vehicle authentication method according to the embodiment, as described above, the terminal device 7 determines whether the time when the door opening detection unit 71 detected the opening of the door of the reference vehicle was within the prescribed period preceding the reception of the response or not. In case where the door of the reference vehicle is opened before the reception of the response from the reference vehicle, for instance, it is conceivable that the reference vehicle is not the reserved vehicle 3 reserved by the user, that is, that the reference vehicle may be a malicious vehicle. Upon the determination that the time when the door opening detection unit 71 detected the opening of the door of the reference vehicle was not within the prescribed period, the terminal device 7 displays the message, indicating that the reference vehicle may be a malicious vehicle, on the display unit 79. Thus the user may acknowledge that the reference vehicle may be a malicious vehicle, based on the message displayed on the display unit 79, so that the safety in the use of vehicles by the user may be promoted.

By the suppression of the erroneous boarding of the user into a vehicle other than the reserved vehicle 3, furthermore, the wasteful dispatch of the reserved vehicle 3 by the vehicle dispatch server 5 may be reduced and thus the decrease in the usage efficiency for the reserved vehicle 3 may be suppressed.

In the modification as well, the function effects similar to those of the first embodiment may be achieved.

Second Embodiment

[Configuration]

Configurations of a vehicle authentication system 200 according to the embodiment will be described with use of FIG. 9.

Figure 9:
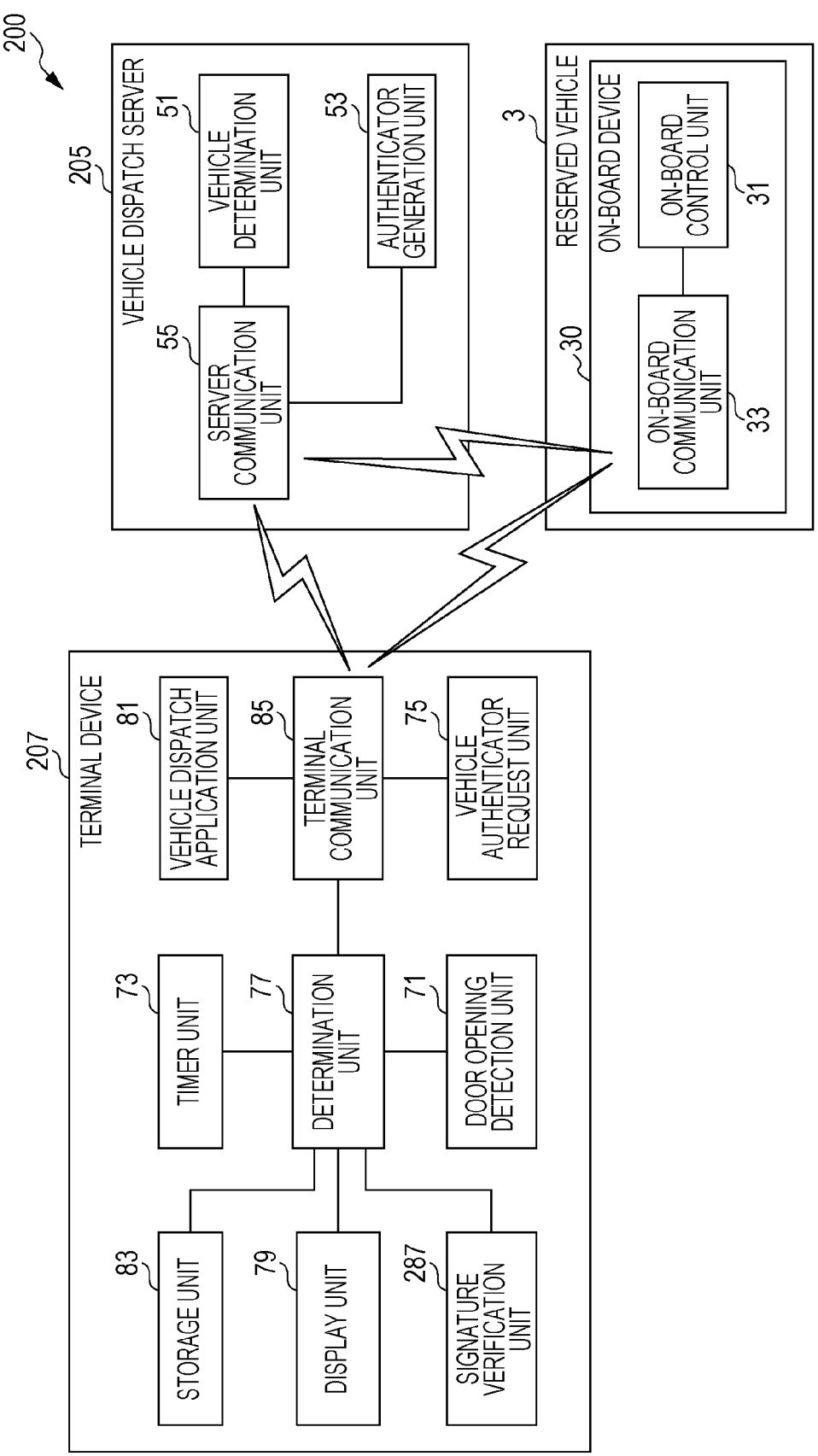
FIG. 9 is a block diagram illustrating a vehicle authentication system according to a second embodiment.

FIG. 9 is a block diagram illustrating the vehicle authentication system 200 according to the second embodiment.

The embodiment differs from the first embodiment in that a terminal device 207 further includes a signature verification unit 287. The vehicle authentication system 200 of the embodiment is similar to the first embodiment except for especially described elements. The same configurations as those of the first embodiment are provided with the same reference characters and detailed description on the configurations is omitted.

As illustrated in FIG. 9, the terminal device 207 includes the signature verification unit 287, in addition to the door opening detection unit 71, the timer unit 73, the vehicle authenticator request unit 75, the determination unit 77, the display unit 79, the vehicle dispatch application unit 81, the storage unit 83, and the terminal communication unit 85. In the embodiment, the terminal device 207 does not have to include the door opening detection unit 71.

The signature verification unit 287 verifies matching between a signature included in the vehicle authenticator transmitted from the reference vehicle in response to the request from the terminal device 207 and a signature included in the vehicle authenticator received from a vehicle dispatch server 205 and outputs a result of verification to the determination unit 77. Herein, the signature refers to an electronic signature added to an electromagnetic record such as data included in each vehicle authenticator. The signature is used for prevention of forgery, falsification, and the like and is equivalent to a signature such as a seal on a paper document, for instance.

As illustrated in FIGS. 5(b) and 9, the determination unit 77 determines whether the signature is authentic or not based on a result of determination by the signature verification unit 287. Upon determination that the signature included in the vehicle authenticator transmitted from the reference vehicle in response to the request from the terminal device 207 differs from the signature included in the vehicle authenticator received from the vehicle dispatch server 205, that is, upon determination that the signature is not authentic, the determination unit 77 causes the display unit 79 to display the message indicating that the reference vehicle is not the reserved vehicle 3, or the like. Then it is conceivable that a reference vehicle different from the reserved vehicle 3 merely transmitted the signature included in the vehicle authenticator, for instance, and the determination unit 77 therefore causes the display unit 79 to display the message indicating that the reference vehicle is not the reserved vehicle 3. Specifically, the determination unit 77 causes the display unit 79 to display the message saying "Please check the vehicle in the OO direction." or the like.

FIG. 5(c) denotes that the reference vehicle may be a malicious vehicle. In case where the signature to be included in the vehicle authenticator transmitted from the reference vehicle in response to the request from the terminal device 207 does not exist, that is, in case where the determination unit 77 determines that the signature is not authentic, the determination unit 77 causes the display unit 79 to display the message indicating that the reference vehicle is not the reserved vehicle 3, or the like, as illustrated in FIGS. 5(c) and 9. It is conceivable that a vehicle authenticator which is nonsense with use of random numbers and which does not include the signature was transmitted, for instance, and some malice is presumed in this case as well. Therefore, the determination unit 77 causes the display unit 79 to display the message indicating that the reference vehicle is not the reserved vehicle 3. Specifically, the determination unit 77 causes the display unit 79 to display a warning message indicating that the reference vehicle may be a dangerous vehicle. The warning message is included in the message indicating that the reference vehicle is not the reserved vehicle 3.

As illustrated in FIGS. 5(a) and 9, the determination unit 77 receives a timer signal from the timer unit 73 and thereby determines whether a second specified period has elapsed or not since the authenticator generation unit 53 in the vehicle dispatch server 205 generated the vehicle authenticator. Upon determination that the second specified period has not elapsed, the determination unit 77 causes the display unit 79 to display a message indicating that the reference vehicle is the reserved vehicle 3 in which the user may get.

Upon determination that the second specified period has elapsed, the determination unit 77 causes the display unit 79 to display the message indicating that the reference vehicle is not the reserved vehicle 3, as illustrated in FIGS. 5(c) and 9. Then it is conceivable that the vehicle authenticator and the signature included in the vehicle authenticator were forged, for instance, and the determination unit 77 therefore causes the display unit 79 to display the warning message indicating that the reference vehicle may be a dangerous vehicle, in order that the user may not get in the reference vehicle.

[Operation]

Subsequently, operations in the vehicle authentication system 200 in the embodiment will be described.

Figure 10:
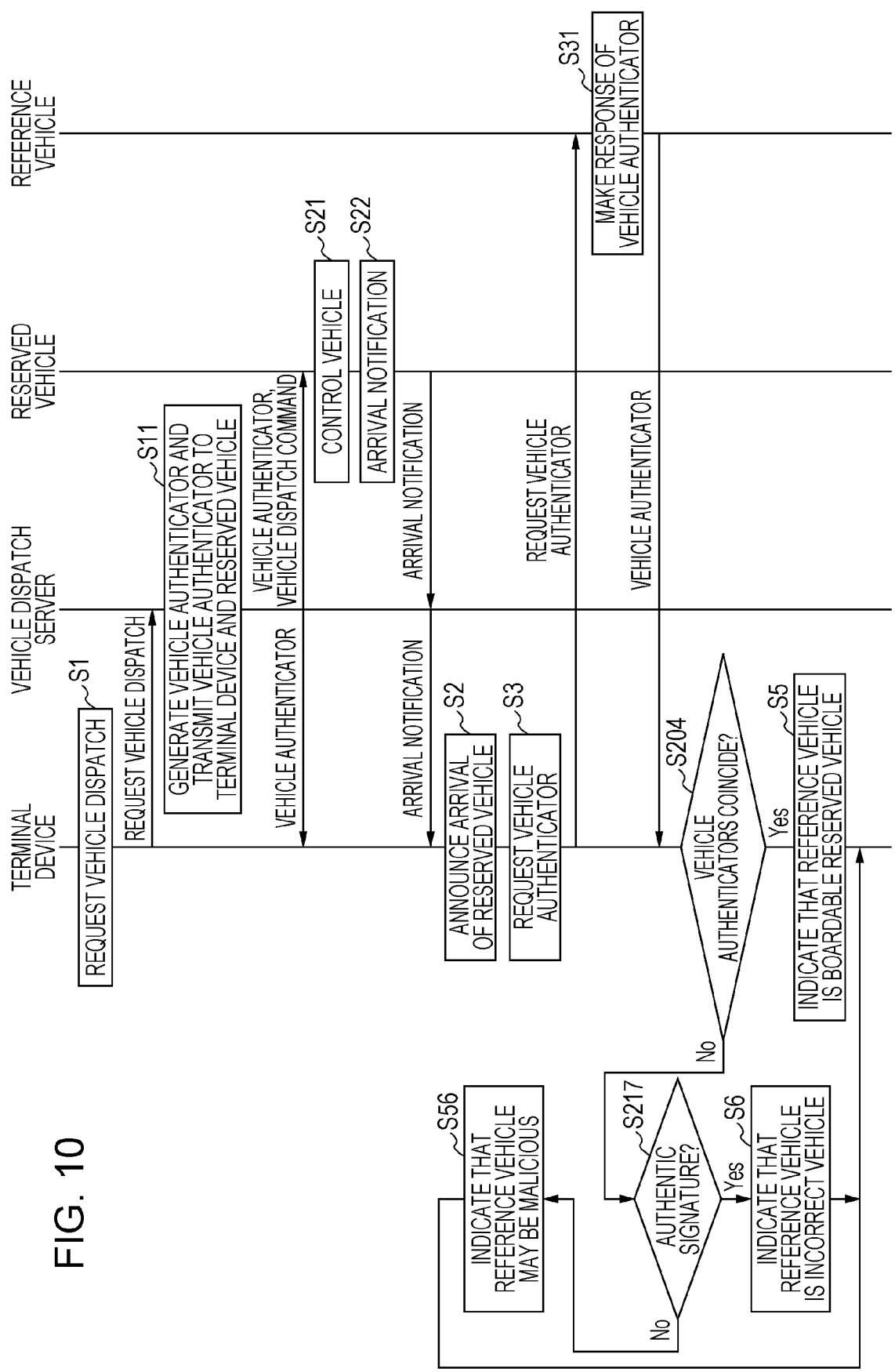
FIG. 10 is a sequence diagram illustrating operations in the vehicle authentication system according to the second embodiment.

FIG. 10 is a sequence diagram illustrating the operations in the vehicle authentication system 200 according to the second embodiment. In FIG. 10, because the reserved vehicle 3 may be coincident or inconsistent with the reference vehicle, the reserved vehicle 3 and the reference vehicle are separated into different flows for convenience. In FIG. 10, because it is assumed that there is the response of the vehicle authenticator from the reference vehicle, step S50 in FIG. 8 and step S54 in FIG. 6 are omitted. In description on the operations in the vehicle authentication system 200 in the embodiment, description on flows that are the same as those of FIGS. 3 and 4 is omitted.

As illustrated in FIG. 10, after the terminal device 207 makes a vehicle dispatch request (S1), the vehicle dispatch server 205 generates a vehicle authenticator and transmits the vehicle authenticator to the reserved vehicle 3 and the terminal device 207 (S11). Subsequently, the on-board control unit 31 controls the reserved vehicle 3 so as to dispatch the reserved vehicle 3 to a designated place (S21) and sends the arrival notification via the vehicle dispatch server 205 to the terminal device 207 (S22). The terminal device 207 announces that the reserved vehicle 3 has arrived (S2). The vehicle authenticator request unit 75 of the terminal device 207 requests a vehicle authenticator that is retained by the reference vehicle (S3).

Subsequently, the on-board control unit 31 receives a request for the vehicle authenticator from the terminal device 207 and makes a response to the request. That is, in case where the reference vehicle is the reserved vehicle 3, the on-board control unit 31 transmits the vehicle authenticator received from the vehicle dispatch server 205 in step S11 and the signature included in the vehicle authenticator to the determination unit 77 of the terminal device 207 (S31).

Subsequently, the determination unit 77 determines whether the vehicle authenticator of the reserved vehicle 3 received in step S11 coincides with the vehicle authenticator received from the reference vehicle in step S31 or not (S204).

Upon determination that the vehicle authenticator of the reserved vehicle 3 received in step S11 does not coincide with the vehicle authenticator received from the reference vehicle in step S31 (No in S204), as illustrated in FIGS. 5(b) and 10, the determination unit 77 determines whether the signature of the vehicle authenticator is authentic or not (S217). The signature verification unit 287 verifies the matching between the signature included in the vehicle authenticator of the reserved vehicle 3 received in step S11 and the signature included in the vehicle authenticator received from the reference vehicle in step S31 and outputs a result of verification to the determination unit 77. Thus the determination unit 77 determines whether the signature of the vehicle authenticator is authentic or not.

When the determination unit 77 determines that the signature of the vehicle authenticator is authentic (Yes in S217), it is conceivable that the reference vehicle is such as a reserved vehicle reserved by another user, for instance, and the determination unit 77 therefore causes the display unit 79 to display the message indicating to the user that the reference vehicle is an incorrect vehicle (S6). Then the determination unit 77 ends this flow. Specifically, the signature verification unit 287 verifies the matching between the signature included in the vehicle authenticator of the reserved vehicle 3 received in step S11 and the signature included in the vehicle authenticator received from the reference vehicle in step S31 and outputs a result of the verification to the determination unit 77. The determination unit 77 is capable of determining whether the signature of the vehicle authenticator is authentic or not based on the result of the verification (S217).

In step S204, the determination unit 77 may determine whether the vehicle authenticator was received from the reference vehicle within the first specified period or not and, in case where the vehicle authenticator was not received from the reference vehicle within the first specified period, may determine that the reference vehicle is not the reserved vehicle 3 (No in S204).

On the other hand, in case where the determination unit 77 determines that the signature of the vehicle authenticator is not authentic (No in S217), it is conceivable that the signature may be a forged signature or the like and the determination unit 77 therefore causes the display unit 79 to display the message indicating that the reference vehicle may be a malicious vehicle (S56). That is, in case where the determination unit 77 determines that the signature is not authentic, there may not be the signature to be included in the vehicle authenticator transmitted from the reference vehicle in response to the request from the terminal device 207. In this case, it is conceivable that the vehicle authenticator may be a forged vehicle authenticator and the determination unit 77 therefore causes the display unit 79 to display the message indicating that the reference vehicle may be a malicious vehicle (S56). Then the determination unit 77 ends this flow.

Upon determination that the vehicle authenticator of the reserved vehicle 3 received in step S11 coincides with the vehicle authenticator received from the reference vehicle in step S31 (Yes in S204), the determination unit 77 causes the display unit 79 to display the message indicating that the reference vehicle is the reserved vehicle 3 in which the user may get. Then the determination unit 77 ends this flow.

As illustrated in FIGS. 5(a) and 10, the determination unit 77 causes the display unit 79 to display the message indicating that the reference vehicle is the reserved vehicle 3 in which the user may get (S5). Then the determination unit 77 ends this flow.

On the other hand, upon determination that the second specified period has elapsed (Yes in S207), the determination unit 77 causes the display unit 79 to display the message indicating that the reference vehicle is not the reserved vehicle 3 in order that the user may not get in the reference vehicle (S6). Then the determination unit 77 ends this flow.

Figure 11:
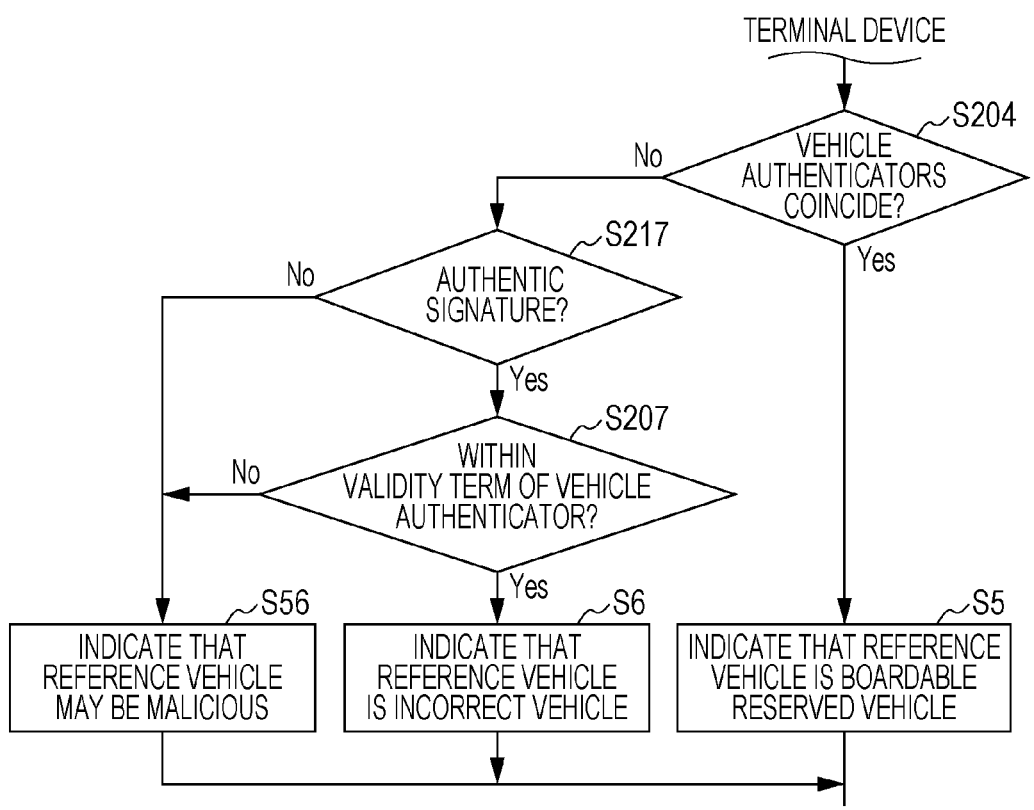
FIG. 11 is a portion of the sequence diagram illustrating the operations in the vehicle authentication system according to the second embodiment.

FIG. 11 is a portion of the sequence diagram illustrating the operations in the vehicle authentication system according to the second embodiment. In FIG. 11, flow including step S207 will be described. In FIG. 11, because it is assumed that there is a response with the vehicle authenticator from the reference vehicle, step S50 in FIG. 8 and step S54 in FIG. 6 are omitted. In description on the operations in the vehicle authentication system in the embodiment, description on flows that are the same as the flows of FIG. 10 is omitted.

As illustrated in FIGS. 10 and 11, the determination unit 77 determines whether the vehicle authenticator of the reserved vehicle 3 received in step S11 coincides with the vehicle authenticator received from the reference vehicle in step S31 or not (S204).

Upon the determination that the vehicle authenticator of the reserved vehicle 3 received in step S11 does not coincide with the vehicle authenticator received from the reference vehicle in step S31 (No in S204), as illustrated in FIGS. 5(b), 10, and 11, the determination unit 77 determines whether the signature of the vehicle authenticator is authentic or not (S217). When the determination unit 77 determines that the signature of the vehicle authenticator is authentic (Yes in S217), the determination unit 77 determines whether the vehicle authenticator is within a validity term thereof or not (S207). This determination is made for checking whether the warning message indicating that the reference vehicle may be a dangerous vehicle is avoided with use of a past old authenticator. Therefore, the determination unit 77 determines whether the second specified period has elapsed or not since the authenticator generation unit 53 in the vehicle dispatch server 205 generated the vehicle authenticator.

In case where the determination unit 77 determines that the second specified period has not elapsed, that is, in case where the vehicle authenticator is within the validity term thereof (Yes in S207), as illustrated in FIGS. 5(b) and 11, it is conceivable that the reference vehicle is such as a reserved vehicle reserved by another user, for instance, and the determination unit 77 therefore causes the display unit 79 to display the message indicating to the user that the reference vehicle is an incorrect vehicle (S6). Then the determination unit 77 ends this flow.

On the other hand, in case where the determination unit 77 determines that the signature of the vehicle authenticator is not authentic (No in S217), as illustrated in FIGS. 5(c), 10, and 11, it is conceivable that the signature may be a forged signature and the determination unit 77 therefore causes the display unit 79 to display the message indicating that the reference vehicle may be a malicious vehicle (S56). Then the determination unit 77 ends this flow.

In case where the determination unit 77 determines that the vehicle authenticator of the reserved vehicle 3 received in step S11 coincides with the vehicle authenticator received from the reference vehicle in step S31 (Yes in S204), it is conceivable that the reference vehicle is the reserved vehicle 3 reserved by the user and the determination unit 77 therefore causes the display unit 79 to display the message indicating that the reference vehicle is the reserved vehicle 3 in which the user may get (S5). Then the determination unit 77 ends this flow.

In case where the determination unit 77 determines that the second specified period has elapsed, that is, in case where the vehicle authenticator is out of the validity term thereof (No in S207), as illustrated in FIGS. 5(c), 10, and 11, it is conceivable that the reference vehicle may be a malicious vehicle and the determination unit 77 therefore causes the display unit 79 to display the message indicating that the reference vehicle may be a malicious vehicle (S56). Then the determination unit 77 ends this flow.

[Function Effect]

Subsequently, function effects of a vehicle authentication method in the embodiment will be described.

In the vehicle authentication method according to the embodiment, as described above, the terminal device 207 determines whether the second specified period has elapsed or not since the vehicle dispatch server 205 generated the vehicle authenticator of the reserved vehicle 3. Upon determination that the second specified period has elapsed, the terminal device 207 displays the message, indicating that the reference vehicle is not the reserved vehicle 3 but may be a malicious vehicle, on the display unit 79. In case where the second specified period has elapsed, it is conceivable that the reference vehicle is not the reserved vehicle 3, that is, that the reference vehicle may be a malicious vehicle. Thus the user may acknowledge that the reference vehicle may be a malicious vehicle, based on the message displayed on the display unit 79, so that the safety in the use of vehicles by the user may be promoted.

By the suppression of the erroneous boarding of the user into a vehicle other than the reserved vehicle 3, additionally, the wasteful dispatch of the reserved vehicle 3 by the vehicle dispatch server 205 may be reduced and thus the decrease in the usage efficiency for the reserved vehicle 3 may be suppressed.

In the vehicle authentication method according to the one embodiment of the disclosure, the terminal device 207 determines whether the signature included in the vehicle authenticator is authentic or not and, upon the determination that the signature is not authentic, displays the message, indicating that the reference vehicle is not the reserved vehicle 3 but may be a malicious vehicle, on the display unit 79 or, upon the determination that the signature is authentic, displays the message, indicating that the reference vehicle is not the reserved vehicle 3 but an incorrect vehicle in which another user is to get, on the display unit 79.

Thus the terminal device 207 determines whether the signature is authentic or not. In case where the terminal device 207 determines that the signature is not authentic, it is conceivable that the signature may be a forged signature or the like and the terminal device 207 therefore causes the display unit 79 to display the message indicating to the user that the reference vehicle may be a malicious vehicle. When the terminal device 207 determines that the signature is authentic, it is conceivable that the reference vehicle is such as a reserved vehicle reserved by another user and the terminal device 207 therefore causes the display unit 79 to display the message indicating to the user that the reference vehicle is an incorrect vehicle. It is thus made possible for the user to acknowledge whether the reference vehicle is an incorrect vehicle or a malicious vehicle. As a result, the safety in the use of vehicles by the user may be promoted.

In the embodiment as well, the function effects similar to those of the first embodiment may be achieved.

Third Embodiment

[Configuration]

Configurations of a vehicle authentication system 300 according to the embodiment will be described with use of FIG. 12.

Figure 12:
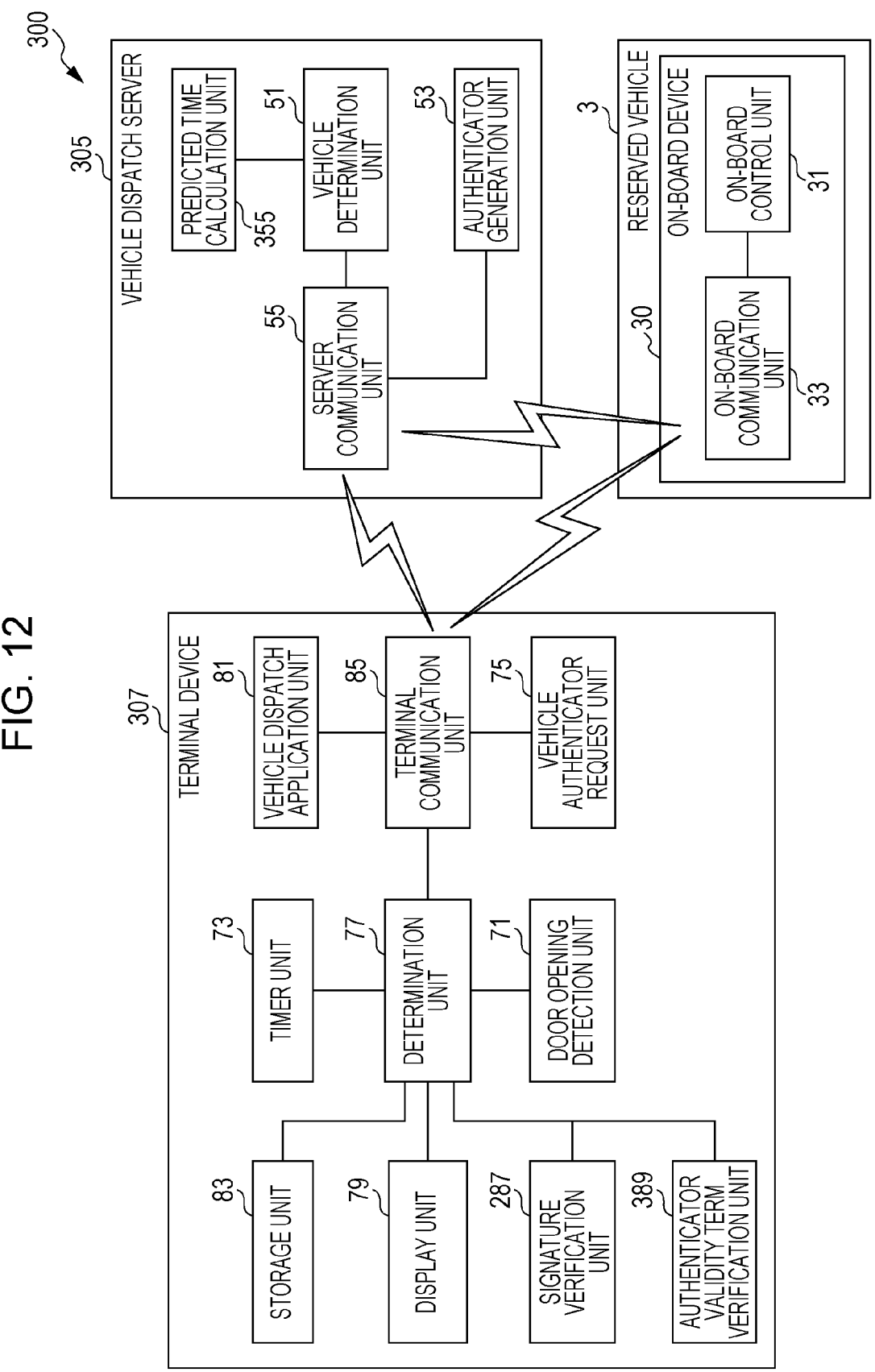
FIG. 12 is a block diagram illustrating a vehicle authentication system according to a third embodiment.

FIG. 12 is a block diagram illustrating the vehicle authentication system 300 according to the third embodiment.

The embodiment differs from the first embodiment in that a terminal device 307 further includes an authenticator validity term verification unit 389 and in that a vehicle dispatch server 305 includes a predicted time calculation unit 355. The vehicle authentication system 300 of the embodiment is similar to the first embodiment or the like except for especially described elements. The same configurations as those of the first embodiment or the like are provided with the same reference characters and detailed description on the configurations is omitted.

As illustrated in FIG. 12, the vehicle dispatch server 305 includes the predicted time calculation unit 355 in addition to the vehicle determination unit 51, the server communication unit 55, and the authenticator generation unit 53.

The predicted time calculation unit 355 calculates predicted time when the reserved vehicle 3 determined by the vehicle determination unit 51 will arrive at the vicinity of the user. The predicted time calculation unit 355 calculates a predicted travel distance from the positional information on the reserved vehicle 3 that has been determined, positional information indicating a place designated by the user, and map information, for instance. Then the predicted time calculation unit 355 calculates a predicted traveling period from the predicted travel distance and the map information and calculates the predicted arrival time of arrival at the vicinity of the user by adding the predicted traveling period to current time indicated by information received from a timer unit built in the vehicle dispatch server 305. The predicted time calculation unit 355 transmits information, indicating the predicted arrival time that has been calculated, to the terminal device 307.

A method of acquiring the positional information on the reserved vehicle 3 may be attained with use of the function of GPS or the like. The predicted time calculation unit 355 may receive map information such as plane rectangular coordinates from an external server via a network with use of the server communication unit 55, for instance. The positional information indicating the designated place may be provided based on the map information.

The authenticator generation unit 53 generates the vehicle authenticator for the authentication of the reserved vehicle 3 determined by the vehicle determination unit 51 based on the user ID and sets a validity term corresponding to the vehicle authenticator. Specifically, the authenticator generation unit 53 generates information, indicating a third specified period consisting of periods before and after the predicted arrival time, based on the predicted arrival time indicated by the information received from the predicted time calculation unit 355. That is, the third specified period is a period that is sum of a period before the predicted arrival time and a period after the predicted arrival time and is the validity term corresponding to the vehicle authenticator. The period before the predicted arrival time and the period after the predicted arrival time may be the same or may be different in length. Therefore, the predicted arrival time has only to be included in the third specified period.

The authenticator generation unit 53 transmits the generated vehicle authenticator and the information, indicating the validity term corresponding to the vehicle authenticator, via the server communication unit 55 to the reserved vehicle 3.

The control unit in the reserved vehicle 3 carries out rewriting into the new vehicle authenticator received via the on-board communication unit 33 and manages the information indicating the validity term corresponding to the vehicle authenticator. The control unit transmits the vehicle authenticator and the information indicating the validity term corresponding to the vehicle authenticator, via the on-board communication unit 33 to the terminal device 307 in response to a request for the vehicle authenticator from the terminal device 307.

The terminal device 307 includes the authenticator validity term verification unit 389 in addition to the door opening detection unit 71, the timer unit 73, the vehicle authenticator request unit 75, the determination unit 77, the display unit 79, the vehicle dispatch application unit 81, the storage unit 83, the terminal communication unit 85, and the signature verification unit 287. In the embodiment, the terminal device 307 does not have to include the door opening detection unit 71.

The authenticator validity term verification unit 389 verifies whether time of the request for the vehicle authenticator is within the third specified period or not. Specifically, based on the time information received from the timer unit 73 on the time of the request for the vehicle authenticator and the information received from the vehicle dispatch server 305 or the reference vehicle on the third specified period, the authenticator validity term verification unit 389 verifies whether the time of the request for the vehicle authenticator, the time being indicated by the time information, is within the third specified period indicated by the information received from the vehicle dispatch server 305 or the reference vehicle or not. The authenticator validity term verification unit 389 outputs information on a result of this verification to the determination unit 77.

The determination unit 77 determines whether time of arrival of the reference vehicle at the vicinity of the user is within the third specified period including the predicted arrival time or not. Upon determination that the third specified period had elapsed, the determination unit 77 causes the display unit 79 to display the message indicating that the reference vehicle is not the reserved vehicle 3.

[Operation]

Subsequently, operations in the vehicle authentication system 300 in the embodiment will be described.

The operations in the embodiment will be described with use of FIG. 11. The embodiment is different in an aspect of the validity term of the vehicle authenticator in step S207 in FIG. 11 and the same in other points and description on flows that are the same as the flows of FIG. 10 is omitted.

As illustrated in FIG. 10, after the terminal device 307 makes a vehicle dispatch request (S1), the vehicle dispatch server 305 receives the vehicle dispatch request and the user ID, determines the reserved vehicle 3 that is to be dispatched to the user, and generates a vehicle authenticator that is to be transmitted to the reserved vehicle 3 (S11). Specifically, the vehicle determination unit 51 determines the reserved vehicle 3 that is to be dispatched to the user. The authenticator generation unit 53 generates the vehicle authenticator for the authentication of the reserved vehicle 3 determined by the vehicle determination unit 51 and sets the information indicating the validity term corresponding to the vehicle authenticator. The vehicle determination unit 51 transmits the generated vehicle authenticator and the information indicating the validity term corresponding to the vehicle authenticator, via the server communication unit 55 to the terminal device 307 and the reserved vehicle 3 (S11). The vehicle determination unit 51 of the vehicle dispatch server 305 generates a vehicle dispatch command for the vehicle dispatch of the reserved vehicle 3 and transmits the vehicle dispatch command via the server communication unit 55 to the reserved vehicle 3 (S11). When transmitting the vehicle authenticator to the terminal device 307, the vehicle determination unit 51 generates information that makes the terminal device 307 display the message indicating that the reservation has been completed and transmits the information via the server communication unit 55 to the terminal device 307 (S11).

Subsequently, the on-board control unit 31 controls the reserved vehicle 3 so as to dispatch the reserved vehicle 3 to a designated place (S21) and sends the arrival notification via the vehicle dispatch server 305 to the terminal device 307 (S22). The terminal device 307 announces to the user that the reserved vehicle 3 has arrived (S2). The vehicle authenticator request unit 75 of the terminal device 307 requests a vehicle authenticator that is retained by the reference vehicle (S3).

Subsequently, the on-board control unit 31 in the reference vehicle receives the request for the vehicle authenticator and makes a response to reception from the vehicle dispatch server 305 in step S11. That is, the on-board control unit 31 transmits the vehicle authenticator received from the vehicle dispatch server 305 in step S11 and the information indicating the validity term corresponding to the vehicle authenticator, to the authenticator validity term verification unit 389 of the terminal device 307 (S31). The validity term corresponding to the vehicle authenticator refers to the third specified period that will be described later.

Subsequently, upon the determination that the vehicle authenticator of the reserved vehicle 3 received in step S11 does not coincide with the vehicle authenticator received from the reference vehicle in step S31 (No in S204), as illustrated in FIGS. 5(b) and 10, the determination unit 77 determines whether the signature of the vehicle authenticator is authentic or not (S217). When the determination unit 77 determines that the signature of the vehicle authenticator is authentic (Yes in S217), the determination unit 77 determines whether the vehicle authenticator is within the validity term thereof or not (S207). In other words, the determination unit 77 determines whether the time of the request for the vehicle authenticator is within the third specified period that is the given period before and after the time of the request or not (S207). Specifically, the authenticator validity term verification unit 389 verifies whether the vehicle authenticator acquired in step S31 is within the validity term corresponding to the vehicle authenticator or not and outputs the information on a result of the verification to the determination unit 77. The determination unit 77 determines whether the time of the request for the vehicle authenticator is within the third specified period or not, based on the result of the verification (S207).

In case where the determination unit 77 determines that the time of the request for the vehicle authenticator is within the third specified period, that is, in case where the vehicle authenticator is within the validity term thereof (Yes in S207), as illustrated in FIGS. 5(b) and 11, it is conceivable that the reference vehicle is such as a reserved vehicle reserved by another user, for instance, and the determination unit 77 therefore causes the display unit 79 to display the message indicating to the user that the reference vehicle is an incorrect vehicle (S6). Then the determination unit 77 ends this flow.

On the other hand, in case where the determination unit 77 determines that the signature of the vehicle authenticator is not authentic (No in S217), it is conceivable that the signature may be a forged signature or the like and the determination unit 77 therefore causes the display unit 79 to display the message indicating that the reference vehicle may be a malicious vehicle (S56). That is, in case where the determination unit 77 determines that the signature is not authentic, there may not be the signature included in the vehicle authenticator transmitted from the reference vehicle in response to the request from the terminal device 307. In this case, it is conceivable that the vehicle authenticator may be a forged vehicle authenticator and the determination unit 77 therefore causes the display unit 79 to display the message indicating that the reference vehicle may be a malicious vehicle (S56). Then the determination unit 77 ends this flow.

In case where the determination unit 77 determines that the vehicle authenticator of the reserved vehicle 3 received in step S11 coincides with the vehicle authenticator received from the reference vehicle in step S31 (Yes in S204), it is conceivable that the reference vehicle is the reserved vehicle 3 reserved by the user and the determination unit 77 therefore causes the display unit 79 to display the message indicating that the reference vehicle is the reserved vehicle 3 in which the user may get (S5). Then the determination unit 77 ends this flow.

On the other hand, in case where the determination unit 77 determines that the time of the request for the vehicle authenticator is not within the third specified period, that is, in case where the vehicle authenticator is not within the validity term thereof (No in S207), as illustrated in FIGS. 5(c) and 11, the determination unit 77 causes the display unit 79 to display the message indicating that the reference vehicle may be a malicious vehicle (S56). Then the determination unit 77 ends this flow.

[Function Effect]

Subsequently, function effects of a vehicle authentication method in the embodiment will be described.

In the vehicle authentication method according to the embodiment, as described above, the vehicle dispatch server 305 calculates the predicted arrival time when the reserved vehicle 3 will arrive at the vicinity of the user and transmits the information indicating the predicted arrival time to the terminal device 307. The terminal device 307 determines whether the time of the arrival of the reference vehicle at the vicinity of the user is within the third specified period including the predicted arrival time or not and, upon the determination that the third specified period had elapsed, displays the message, indicating that the reference vehicle is not the reserved vehicle 3 but may be a malicious vehicle, on the display unit 79. In case where the third specified period had elapsed, it is conceivable that the reference vehicle is not the reserved vehicle 3, that is, that the reference vehicle may be a malicious vehicle. Thus the user may acknowledge that the reference vehicle may be a malicious vehicle, based on the message displayed on the display unit 79, so that the safety in the use of vehicles by the user may be promoted.

Additionally, by the suppression of the erroneous boarding of the user into a vehicle other than the reserved vehicle 3, wasteful dispatch of the reserved vehicle 3 by the vehicle dispatch server 305 may be reduced and thus the decrease in the usage efficiency for the reserved vehicle 3 may be suppressed.

In the embodiment as well, the function effects similar to those of the first embodiment may be achieved.

(Other Modifications)

Though the vehicle authentication methods, the programs, the terminal devices, and the vehicle authentication systems according to the first embodiment to the third embodiment and the modification of the first embodiment of the disclosure have been described above, the disclosure is not limited to the first embodiment to the third embodiment and the modification of the first embodiment that have been described above.

For instance, processing units included in the terminal devices, the vehicle dispatch servers, and the on-board devices according to the first embodiment to the third embodiment and the modification of the first embodiment are typically implemented as LSIs that are integrated circuits. The LSIs may be separately provided as single chips or some or all of the LSIs may be integrated on a single chip.

Formation of the integrated circuits may be achieved by use of dedicated circuits or general-purpose processors without limitation to LSIs. Field programmable gate arrays (FPGAs) that are programmable after manufacture of the LSIs or reconfigurable processors in which connection or setting of circuit cells inside the LSI can be reconfigured may be used.

Components of the first embodiment to the third embodiment and the modification of the first embodiment may be formed of dedicated hardware or may be implemented by execution of software programs suitable for the components. The components may be implemented by readout and execution of software programs, recorded in recording media such as hard disks or semiconductor memories, by program execution units such as CPUs or processors.

All numbers used in the above are examples for specific description on the disclosure and embodiments of the disclosure are not limited by the numbers used as the examples.

Division into functional blocks in the block diagrams is an example. Implementation of a plurality of functional blocks as one functional block, division of one functional block into a plurality of functional blocks, or transfer of some of functions to other functional blocks may be carried out. Functions of a plurality of functional blocks having similar functions may be subjected to parallel processing or time-sharing processing in single hardware or software.

Sequences of execution of the steps in the flow charts are illustrated as examples for the specific description on the disclosure and sequences other than the above may be used. Some of the steps may be executed at the same time as (in parallel with) other steps.

Though the vehicle authentication methods, the programs, the terminal devices, and the vehicle authentication systems according to one aspect or a plurality of aspects have been described above based on the first embodiment to the third embodiment and the modification of the first embodiment, the first embodiment to the third embodiment and the modification of the first embodiment of the disclosure are not limited to the plurality of aspects. The first embodiment to the third embodiment and the modification of the first embodiment for which variations conceivable by those skilled in the art are provided and forms constructed by combining components of different embodiments or modifications thereof may be included within the scope of the one aspect or the plurality of aspects, unless departing from the purport of the disclosure.

The disclosure may be applied to a vehicle having an automated driving function, a terminal device for reservation of vehicle dispatch, a server for control or management of the vehicle, or the like or a system including these.

What is claimed is:

1. A vehicle security authentication method performed by a user terminal device to determine whether a reference vehicle having arrived at a location of a user is a reserved vehicle, another vehicle, or a potentially-malicious vehicle, the vehicle security authentication method comprising:
receiving, by a terminal communicator of the user terminal device, a first vehicle authenticator for authentication of the reserved vehicle from a vehicle dispatch server;
receiving, by the terminal communicator, arrival notification from the vehicle dispatch server;
transmitting, in response to receiving the arrival notification from the vehicle dispatch server, by the terminal communicator to the reference vehicle, a request for a second vehicle authenticator for authentication of the reference vehicle;

receiving, by the terminal communicator, the second vehicle authenticator from the reference vehicle;

determining whether the second vehicle authenticator of the reference vehicle coincides with the first vehicle authenticator of the reserved vehicle;

authenticating that the reference vehicle is the reserved vehicle when the user terminal device determines that the received second vehicle authenticator coincides with the received first vehicle authenticator;

determining that the reference vehicle is not the reserved vehicle when the user terminal device determines that the received second vehicle authenticator does not coincide with the received first vehicle authenticator;

determining that the reference vehicle is a potentially-malicious vehicle when the terminal communicator of the user terminal device does not receive the second vehicle authenticator within a first specified time period after the request for the second vehicle authenticator is sent to the reference vehicle;

communicating to the user by a display on the user terminal device one of (i) an authentication message verifying that the reference vehicle is the reserved vehicle, (ii) an information message conveying that the reference vehicle is not the reserved vehicle, and (iii) a warning message cautioning that the reference vehicle is a potentially-malicious vehicle;

detecting opening of a door of the reference vehicle with use of a sensor of the terminal device;

determining whether a time of the detection of the opening of the door of the reference vehicle by the sensor is within a prescribed period preceding the reception of the response;

when the time of the detection by the sensor is not within the prescribed period, displaying the warning message, indicating that the reference vehicle is not the reserved vehicle but may be a potentially-malicious vehicle, on the display, and upon reception of a vehicle dispatch command by the reserved vehicle, an on-board controller of the reserved vehicle controls an actuator of the reserved vehicle to physically move the reserved vehicle to a place designated by the user terminal device.

2. The vehicle authentication method according to claim 1, wherein the user terminal device and the reserved vehicle each receive and retain the first vehicle authenticator for the authentication of the reserved vehicle from the vehicle dispatch server before the determination is made, and the first vehicle authenticator for the authentication of the reserved vehicle is generated by the vehicle dispatch server.

3. The vehicle authentication method according to claim 2, further comprising:

determining whether a second specified period has elapsed or not since the vehicle dispatch server generated the first vehicle authenticator of the reserved vehicle; and when the second specified period has elapsed, displaying a message, indicating that the vehicle is not the reserved vehicle, but may be a potentially-malicious vehicle, on the display.

4. The vehicle authentication method according to claim 3, further comprising:

determining whether a signature included in the vehicle authenticator is authentic or not; and when the signature is not authentic, displaying a message, indicating that the vehicle is not the reserved vehicle, but an incorrect vehicle in which another user is to get, on the display; or when the signature is authentic, displaying the message, indicating that the vehicle is not the reserved vehicle, but may be a potentially-malicious vehicle, on the display.

5. The vehicle authentication method according to claim 2, further comprising:

receiving a predicted arrival time when the reserved vehicle will arrive at the location of the user;

determining whether a time of arrival of the vehicle at the location of the user is within a third specified period including the predicted arrival time or not; and when the third specified period has elapsed, displaying a message, indicating that the vehicle is not the reserved vehicle, but may be a potentially-malicious vehicle, on the display, wherein the predicted arrival time is calculated by the vehicle dispatch server.

6. The vehicle security authentication method according to claim 1, wherein the sensor is a microphone to collect sounds made upon the opening of the door of the reference vehicle.

7. The vehicle security authentication method according to claim 1, wherein the sensor is a camera to collect images of the door of the reference vehicle upon the opening of the door of the reference vehicle.

8. A non-transitory recording medium, storing a program that makes a computer execute the vehicle authentication method, according to claim 1.

9. A user terminal device that authenticates whether a reference vehicle having arrived at a location of a user is a reserved vehicle another vehicle, or a potentially-malicious vehicle, the user terminal device comprising:

a terminal communicator configured to
  receive a first vehicle authenticator for authentication of the reserved vehicle from a vehicle dispatch server,
  receive an arrival notification from the vehicle dispatch server,
  transmit, in response to receiving the arrival notification from the vehicle dispatch server to the reference vehicle, a request for a second vehicle authenticator for authentication of the reference vehicle, and
  receive the second vehicle authenticator from the reference vehicle;

a processor;

a display;

a non-transitory recording medium storing thereon a computer program, which when executed by the processor, causes the processor to perform operations including
  determining whether the second vehicle authenticator of the reference vehicle coincides with the first vehicle authenticator of the reserved vehicle,
  authenticating that the reference vehicle is the reserved vehicle when the user terminal device determines that the received second vehicle authenticator coincides with the received first vehicle authenticator,
  determining that the reference vehicle is not the reserved vehicle when the user terminal device determines that the received second vehicle authenticator does not coincide with the received first vehicle authenticator, determining that the reference vehicle is a potentially-malicious vehicle when the terminal communicator does not receive the second vehicle authenticator within a first specified time period after the request for the second vehicle authenticator is sent to the reference vehicle, detecting opening of a door of the reference vehicle with use of a sensor of the terminal device, determining whether a time of the detection of the opening of the door of the reference vehicle by the sensor is within a prescribed period preceding the reception of the response, when the time of the detection by the sensor is not within the prescribed period, displaying the warning message, indicating that the reference vehicle is not the reserved vehicle but may be a potentially-malicious vehicle, on the display, communicating via the display to the user one of (i) an authentication message verifying that the reference vehicle is the reserved vehicle, (ii) an information message conveying that the reference vehicle is not the reserved vehicle, and (iii) a warning message cautioning that the reference vehicle is a potentially-malicious vehicle, and upon reception of a vehicle dispatch command by the reserved vehicle, an on-board controller of the reserved vehicle controls an actuator of the reserved vehicle to physically move the reserved vehicle to a place designated by the user terminal device.

10. A vehicle security authentication system, comprising:
a user terminal device;
a reserved vehicle in which a user is to get in accordance with a reservation; and
a vehicle dispatch server that determines the reserved vehicle,
wherein the user terminal device includes
a terminal communicator configured to
receive a first vehicle authenticator for authentication of the reserved vehicle from the vehicle dispatch server,
receive an arrival notification from the vehicle dispatch server,
transmit, in response to receiving the arrival notification from the vehicle dispatch server to a reference vehicle, a request for a second vehicle authenticator for authentication of the reference vehicle, and
receive the second vehicle authenticator from the reference vehicle;
a processor;
a display;
a non-transitory recording medium storing thereon a computer program, which when executed by the processor, causes the processor to perform operations including
determining whether the second vehicle authenticator of the reference vehicle coincides with the first vehicle authenticator of the reserved vehicle,
authenticating that the reference vehicle is the reserved vehicle when the user terminal device determines that the received second vehicle authenticator coincides with the received first vehicle authenticator,
determining that the reference vehicle is not the reserved vehicle when the user terminal device determines that the received second vehicle authenticator does not coincide with the received first vehicle authenticator,
determining that the reference vehicle is a potentially-malicious vehicle when the terminal communicator does not receive the second vehicle authenticator within a first specified time period after the request for the second vehicle authenticator is sent to the reference vehicle,
detecting opening of a door of the reference vehicle with use of a sensor of the terminal device,
determining whether a time of the detection of the opening of the door of the reference vehicle by the sensor is within a prescribed period preceding the reception of the response,
when the time of the detection by the sensor is not within the prescribed period, displaying the warning message, indicating that the reference vehicle is not the reserved vehicle but may be a potentially-malicious vehicle, on the display, and
communication via the display to the user one of (i) an authentication message verifying that the reference vehicle is the reserved vehicle, (ii) an information message conveying that the reference vehicle is not the reserved vehicle, and (iii) a warning message cautioning that the reference vehicle is a potentially-malicious vehicle, and
upon reception of a vehicle dispatch command by the reserved vehicle, an on-board controller of the reserved vehicle controls an actuator of the reserved vehicle to physically move the reserved vehicle to a place designated by the user terminal device.

* * * * *